US008223411B2

(12) United States Patent
Akiyama et al.

(10) Patent No.: US 8,223,411 B2
(45) Date of Patent: Jul. 17, 2012

(54) IMAGE PROCESSING SYSTEM, IMAGE PROCESSING APPARATUS, IMAGE PROCESSING METHOD

(75) Inventors: Toshio Akiyama, Tokyo (JP); Yasushi Yamaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 409 days.

(21) Appl. No.: 12/641,943

(22) Filed: Dec. 18, 2009

(65) Prior Publication Data

US 2010/0182618 A1 Jul. 22, 2010

(30) Foreign Application Priority Data

Jan. 20, 2009 (JP) ................................ 2009-010340
Nov. 2, 2009 (JP) ................................ 2009-252187

(51) Int. Cl.
*G03F 3/08* (2006.01)
*G06K 9/00* (2006.01)
(52) U.S. Cl. ...................... 358/522; 358/523; 382/168
(58) Field of Classification Search .................. None
See application file for complete search history.

(56) References Cited

U.S. PATENT DOCUMENTS

| 6,721,066 B2 * | 4/2004 | Hirota et al. ................... 358/1.9 |
| 7,433,524 B2 | 10/2008 | Yamaguchi et al. |
| 2008/0219553 A1 | 9/2008 | Akiyama |
| 2008/0239347 A1 * | 10/2008 | Minamino et al. ............. 358/1.9 |
| 2009/0034005 A1 * | 2/2009 | Gotoh .......................... 358/3.06 |
| 2009/0132492 A1 | 5/2009 | Satoh et al. |

FOREIGN PATENT DOCUMENTS

| JP | 63-298487 | 12/1988 |
| JP | 5-233875 | 9/1993 |
| JP | 5-328097 | 12/1993 |
| JP | 6-20092 | 1/1994 |
| JP | 2002-77669 | 3/2002 |
| JP | 2002-288589 | 10/2002 |
| JP | 2004-104435 | 4/2004 |
| JP | 2004-320701 | 11/2004 |
| JP | 2005-301672 | 10/2005 |
| JP | 2006-128987 | 5/2006 |
| JP | 2006-260274 | 9/2006 |
| JP | 2007-18158 | 1/2007 |
| JP | 3960756 | 5/2007 |
| JP | 2008-219820 | 9/2008 |

* cited by examiner

*Primary Examiner* — James A Thompson
(74) *Attorney, Agent, or Firm* — Oblon, Spivak, McClelland, Maier & Neustadt, L.L.P.

(57) ABSTRACT

An image processing system includes an acquiring unit configured to acquire image data; a first determination unit configured to create histograms of colors in the acquired image data, and determine deemed background colors with the use of the histograms; a second determination unit configured to determine a background color based on the deemed background colors; a counting unit configured to count a number of pixels corresponding to character colors in the image data, wherein colors other than the background color are the character colors; and a deciding unit configured to obtain a ratio of the number of pixels corresponding to the character colors to a total number of pixels in the image data, and perform blank page determination on the image data by determining that the image data is blank when the ratio is less than a predetermined value.

13 Claims, 25 Drawing Sheets

FIG.10

TRUE=BLANK PAGE,
FALSE=NOT BLANK PAGE

| FILE NAME | IMAGE | BLANK PAGE | BLANK PAGE DETERMINATION RESULT (STANDARD) | | | |
|---|---|---|---|---|---|---|
| | | | PRESENT INVENTION | CONVEN-TIONAL 1 | CONVEN-TIONAL 2 | IMPROVED |
| A | | O | TRUE | FALSE | TRUE | TRUE |
| B | | × | FALSE | FALSE | FALSE | FALSE |
| C | | O | TRUE | FALSE | TRUE | TRUE |
| D | | × | FALSE | FALSE | TRUE | TRUE |
| E | | × | FALSE | FALSE | TRUE | FALSE |
| F | | × | FALSE | FALSE | TRUE | FALSE |
| G | | × | FALSE | FALSE | FALSE | FALSE |
| PROCESSING TIME (SEC) | | | 0.95 | 1.19 | 1.05 | 1.61 |

FIG.11A

BLANK PAGE DETERMINATION RESULT

| | PRESENT INVENTION | CONVENTIONAL 3 |
|---|---|---|
| SCAN IN VERTICAL DIRECTION | SUCCESS RATE 100% | SUCCESS RATE 90% |
| SCAN IN HORIZONTAL DIRECTION | SUCCESS RATE 100% | SUCCESS RATE 70% |

FIG.11B

PROCESSING TIME

| | PRESENT INVENTION | CONVENTIONAL 3 |
|---|---|---|
| 1 BIT MONOCHROME IMAGE | APPROXIMATELY 7 SEC | APPROXIMATELY 28 SEC |
| 8 BIT GRAY IMAGE | APPROXIMATELY 6 SEC | APPROXIMATELY 18 SEC |
| 24 BIT COLOR IMAGE | APPROXIMATELY 5 SEC | APPROXIMATELY 19 SEC |

FIG.22

MANY BLANK PAGES HAVE BEEN DETECTED.

DO YOU WANT TO CONTINUE THE DISTRIBUTION PROCESS?

YES     NO

IMAGE PROCESSING SYSTEM, IMAGE PROCESSING APPARATUS, IMAGE PROCESSING METHOD

BACKGROUND OF THE INVENTION

1. Field of the Invention

The present invention relates to an image processing system, an image processing apparatus, and an image processing method for performing blank page determination.

2. Description of the Related Art

Conventionally, there is a typically used method referred to as "blank page determination" for determining whether the correct side of an original has been scanned with the use of an image processing function. The blank page determination method deletes image data determined as being blank (i.e., image data obtained by scanning a blank page). Accordingly, this method reduces the resources used for image processing (e.g., less memory area), and also reduces processing time. Furthermore, the blank page determination method can be applied to various technologies, such as dividing a document at blank pages, single-sided scanning, double-sided scanning, improving the printing efficiency, and page alignment (See Japanese Laid-Open Patent Application No. 2008-219820 (patent document 1), or Japanese Laid-Open Patent Application No. 2002-077669 (patent document 2)).

However, originals to be scanned include various contents. There may be a page that should not be determined as a blank page even though there are no characters. There may be a page that should be determined as a blank page because there are no characters, but the page is not determined as a blank page due to patterns or noise. Thus, the conventional technology has not been capable of accurately determining blank pages. Furthermore, the conventional technology has not been capable of handling originals of various colors (white page, black page, colored page, inverted colors, and a page in which characters and background colors are combined in various ways).

Patent Document 1: Japanese Laid-Open Patent Application No. 2008-219820
Patent Document 2: Japanese Laid-Open Patent Application No. 2002-077669

SUMMARY OF THE INVENTION

The present invention provides an image processing system, an image processing apparatus, and an image processing method, in which one or more of the above-described disadvantages are eliminated.

A preferred embodiment of the present invention provides an image processing system, an image processing apparatus, and an image processing method capable of appropriately handling various kinds of image data so that the blank page detection rate can be improved.

According to an aspect of the present invention, there is provided an image processing system for acquiring image data and processing the image data, the image processing system including an acquiring unit configured to acquire the image data; a first determination unit configured to create one or more histograms of one or more colors in the image data acquired by the acquiring unit, and determine one or more deemed background colors with the use of the histograms; a second determination unit configured to determine a background color based on the deemed background colors determined by the first determination unit; a counting unit configured to count a number of pixels corresponding to one or more character colors in the image data, wherein colors other than the background color determined by the second determination unit are the character colors; and a deciding unit configured to obtain a ratio of the number of pixels corresponding to the character colors counted by the counting unit to a total number of pixels in the image data, and perform blank page determination on the image data by determining that the image data is blank when the ratio is less than a first predetermined value.

According to an aspect of the present invention, there is provided an image processing apparatus including an acquiring unit configured to acquire image data; a first determination unit configured to create one or more histograms of one or more colors in the image data acquired by the acquiring unit, and determine one or more deemed background colors with the use of the histograms; a second determination unit configured to determine a background color based on the deemed background colors determined by the first determination unit; a counting unit configured to count a number of pixels corresponding to one or more character colors in the image data, wherein colors other than the background color determined by the second determination unit are the character colors; and a deciding unit configured to obtain a ratio of the number of pixels corresponding to the character colors counted by the counting unit to a total number of pixels in the image data, and perform blank page determination on the image data by determining that the image data is blank when the ratio is less than a first predetermined value.

According to an aspect of the present invention, there is provided an image processing method including an acquiring step of acquiring image data; a first determination step of creating one or more histograms of one or more colors in the image data acquired at the acquiring step, and determining one or more deemed background colors with the use of the histograms; a second determination step of determining a background color based on the deemed background colors determined at the first determination step; a counting step of counting a number of pixels corresponding to one or more character colors in the image data, wherein colors other than the background color determined at the second determination step are the character colors; and a deciding step of obtaining a ratio of the number of pixels corresponding to the character colors counted at the counting step to a total number of pixels in the image data, and performing blank page determination on the image data by determining that the image data is blank when the ratio is less than a first predetermined value.

According to one embodiment of the present invention, an image processing system, an image processing apparatus, and an image processing method are provided, which are capable of appropriately handling various kinds of image data so that the blank page detection rate can be improved.

BRIEF DESCRIPTION OF THE DRAWINGS

Other objects, features and advantages of the present invention will become more apparent from the following detailed description when read in conjunction with the accompanying drawings, in which:

FIG. 10 indicates experimental results 1 of blank page determination according to the first embodiment;

FIGS. 11A and 11B indicate experimental results 2 of blank page determination according to the first embodiment;

FIG. 22 illustrates an example of a confirmation screen page of a blank page detection error;

DETAILED DESCRIPTION OF THE PREFERRED EMBODIMENTS

A description is given, with reference to the accompanying drawings, of embodiments of the present invention.

In the following embodiments, a multifunction peripheral including a printer function, a scanner function, a copy function, and a fax function installed in a single casing, is taken as an example of an image forming apparatus to which image data is input. However, the present invention is not sc limited, and is also applicable to any image forming apparatus such as a scanner, a fax machine, and a copier, as long as image data can be input.

First Embodiment

System Configuration and Hardware Configuration

Figure 1:
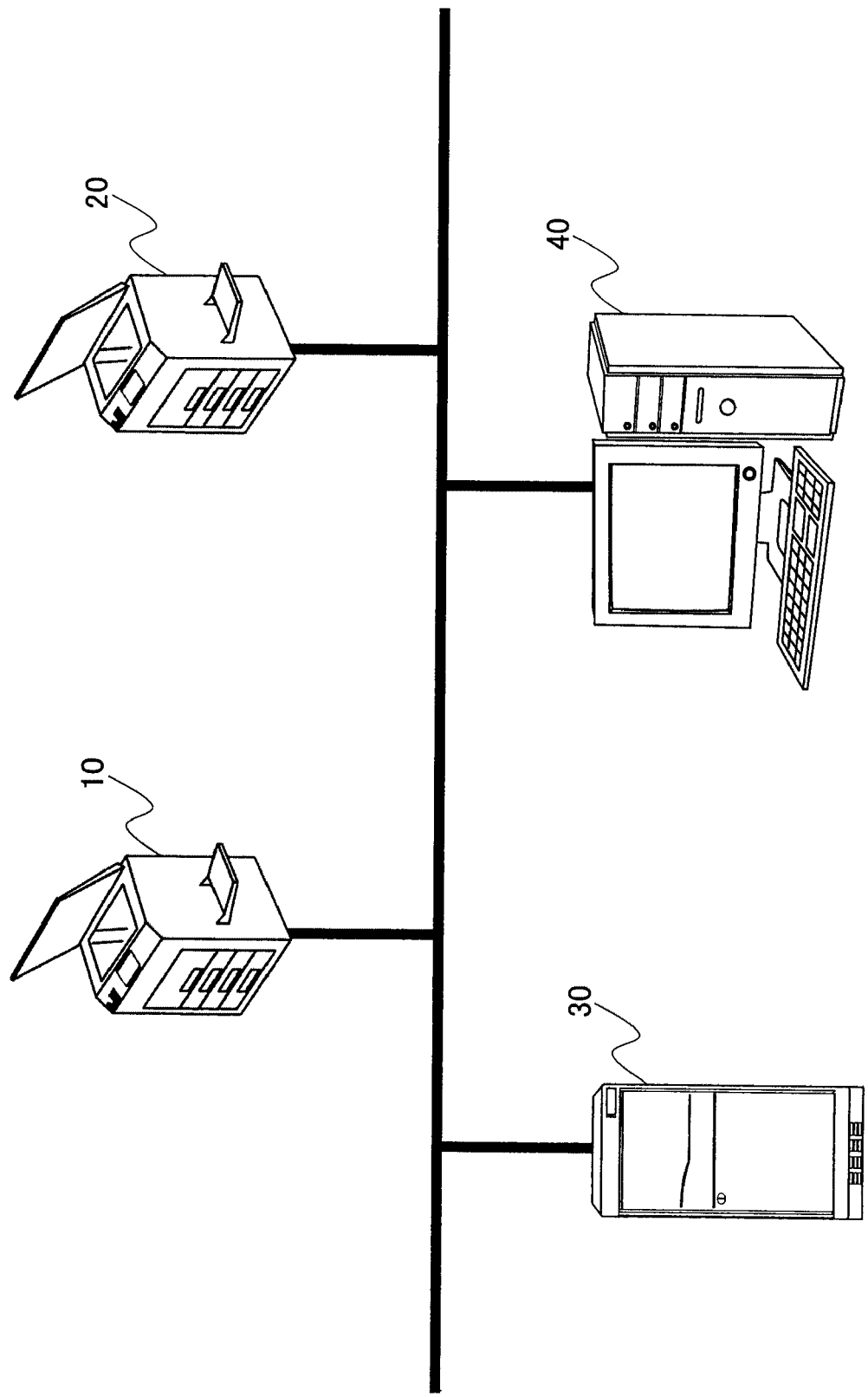
FIG. 1 illustrates an example of an image processing system according to a first embodiment of the present invention.

FIG. 1 illustrates an example of an image processing system according to a first embodiment of the present invention. As shown in FIG. 1, the image processing system includes an MFP (Multifunction Peripheral) 10, an MFP 20, an image processing server 3C, and an information processing terminal (for example, a PC (Personal Computer), a PDA (Personal Data Assistance)) 40, which are connected via a network.

Each of the MFP 10 and the MFP 20 has a scanner function, a copy function, a printer function, and a fax function installed in a single casing. The MFP 10 and the MFP 20 generate image data by scanning a paper medium with the scanner function, and sends the generated image data to the image processing server 30. Details of the MFP are given below.

The image processing server 30 is a computer such as a workstation for receiving image data obtained by a scanning process of each MFP, and executing various processes such as a distributing process in accordance with specified distribution settings. Distribution settings include e-mail distribution, fax distribution, and a folder distribution. The image processing server 30 distributes image data to an e-mail server or a file server depending on the distribution destination. The image processing server 30 performs blank page determination on the acquired image data, and prevents needless data from being delivered or stored.

The image processing server 30 is also for executing a workflow based on input image information, and storing or distributing a document according to a workflow formulated by a user. That is, the image processing server 30 also functions as an image processing apparatus as it processes an image. Details of the image processing server 30 are given below.

At the information processing terminal 40, a management tool pertaining to data distribution is activated by the administrator, and distribution settings are created by sequentially selecting plug-ins for input, image conversion, and output.

Figure 2:
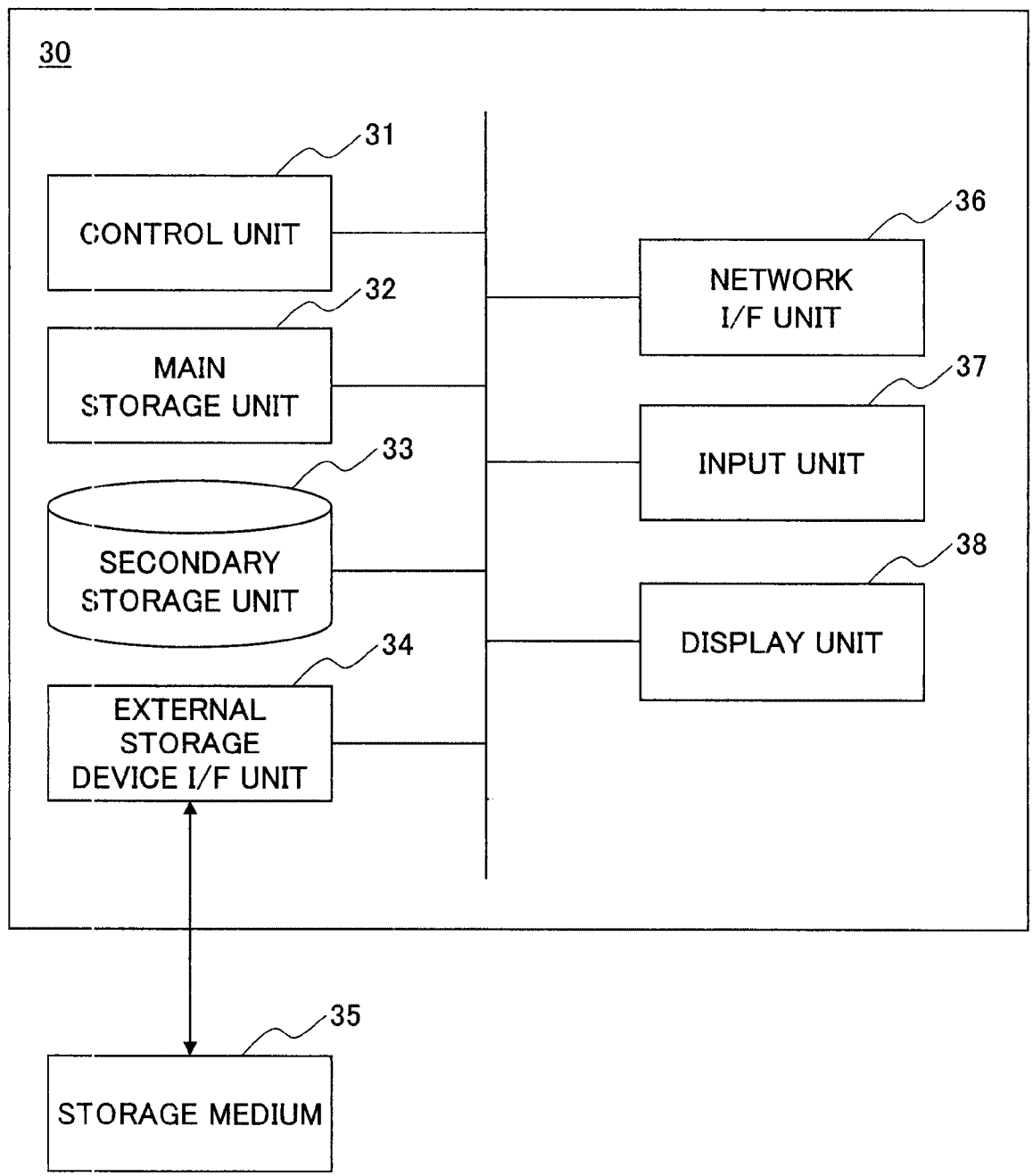
FIG. 2 illustrates an example of a hardware configuration of an image processing server according to the first embodiment.

A description is given of a hardware configuration of the image processing server 30 according to the first embodiment. FIG. 2 illustrates an example of a hardware configuration of the image processing server 30 according to the first embodiment.

As shown in FIG. 2, the image processing server 30 includes a control unit 31, a main storage unit 32, a secondary storage unit 33, an external storage device I/F unit 34, a network I/F unit 36, an input unit 37, and a display unit 38.

The control unit 31 is a CPU for controlling the respective units and for computing and processing data. The control unit 31 is a processor for executing programs stored in the main storage unit 32. The control unit 31 receives data from an input device or a storage device, performs computing and processing on the data, and outputs the data to an output device or a storage device.

The main storage unit 32 may be a ROM (Read Only Memory) or a RAM (Random Access Memory), which is a storage device for storing or temporarily holding programs executed by the control unit 31 such as the OS that is the basic software and application software, and data.

The secondary storage unit 33 may be a HDD (Hard Disk Drive), which is a storage device for storing data related to application software.

The external storage device I/F unit 34 is an interface such as a USB (Universal Serial Bus) between the image processing server 30 and a storage medium 35 (for example, a flash memory) connected to the image processing server 30 via a data transmission path.

The storage medium 35 stores a predetermined program, the program stored in the storage medium 35 is installed in the image processing server 30 via the external storage device I/F unit 34, and the installed predetermined program is executable by the image processing server 30.

The network I/F unit 36 is an interface between the image processing server 30 and peripheral devices having communications functions connected to the image processing server 30 via a network such as LAN (Local Area Network) or WAN (Wide Area Network) constituted by data transmission paths such as wired and/or wireless lines.

The input unit 37 includes a keyboard including a curser key, a numerical keypad, and various functional keys, and a mouse and a slice pad for selecting a key on a display screen page of the display unit 38. The input unit 37 is a user interface for the user for giving operation instructions to the control unit 31 or for inputting data.

The display unit 38 may be a CRT or an LCD, and displays information in accordance with display data input from the control unit 31.

<Function Configuration>

Figure 3:
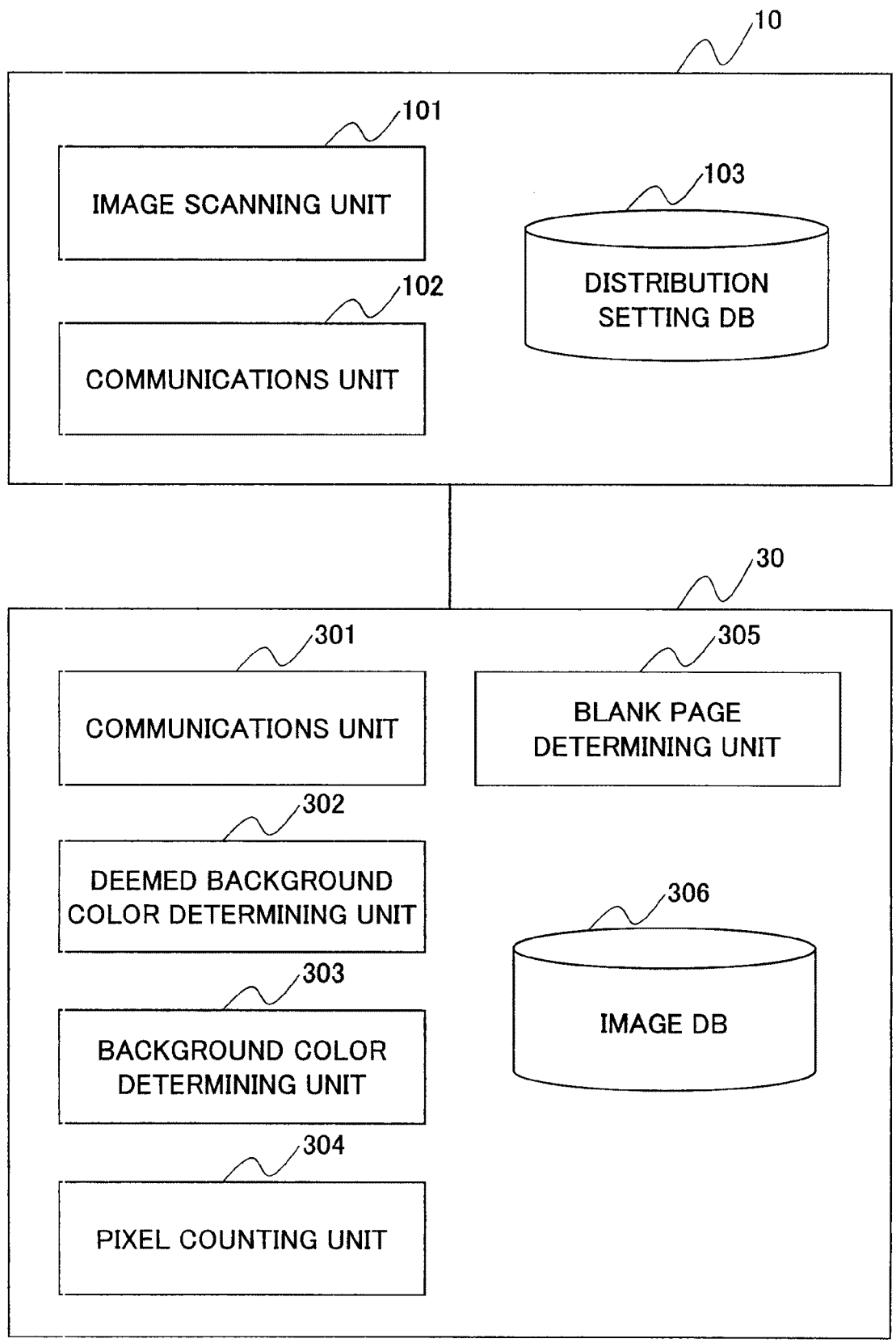
FIG. 3 is a functional block diagram of an MFP and the image processing server according to the first embodiment.

FIG. 3 is a functional block diagram of the MFP 10 and the image processing server 30. First, a description is given of the main functions of the MFP 10. The MFP 10 includes an image scanning unit 101, a communications unit 102, and a distribution setting DE 103. Other functions that are typically included in an MFP, such as a printer function, a copy function, and a fax function, are not shown.

The image scanning unit 101 scans an original with the scanning function to acquire image data. The image data may be acquired by receiving the image data by fax transmission or by acquiring the image data from the information processing terminal 40.

The communications unit 102 transmits and receives device information and image data. Particularly, when a distribution process request or a blank page detection request for image data is received from a user, the communications unit 102 transmits image data and the request to the image processing server 30.

The distribution setting DB 103 stores the plug-ins for input, image conversion, and output, and also stores one or more workflows in which the respective plug-ins are combined. The distribution setting DB 103 may be provided in the image processing server 30; and when the distribution setting DB 103 is provided in the image processing server 30, the MFP 10 does not need to be provided with the distribution setting DB 103.

Next, a description is given of the main functions of the image processing server 30. The image processing server 30 includes a communications unit 301, a deemed background color determining unit 302, a background color determining unit 303, a pixel counting unit 304, a blank page determining unit 305 (deciding unit), and an image DB 306.

The communications unit 301 transmits and receives device information and image data. Particularly, the communications unit 301 receives image data from the MFP 10, and sends image data that has undergone image processing to a destination specified in the distribution settings.

The deemed background color determining unit 302 creates a histogram for each color in the image data (R, G, B) acquired by the communications unit 301, and uses the histograms to deem the colors within a predetermined range as the deemed background colors. That is, colors that most frequently appear in the image data are deemed as the deemed background colors. Details of the deemed background color determining unit 302 are given with reference to FIG. 4.

Figure 4:
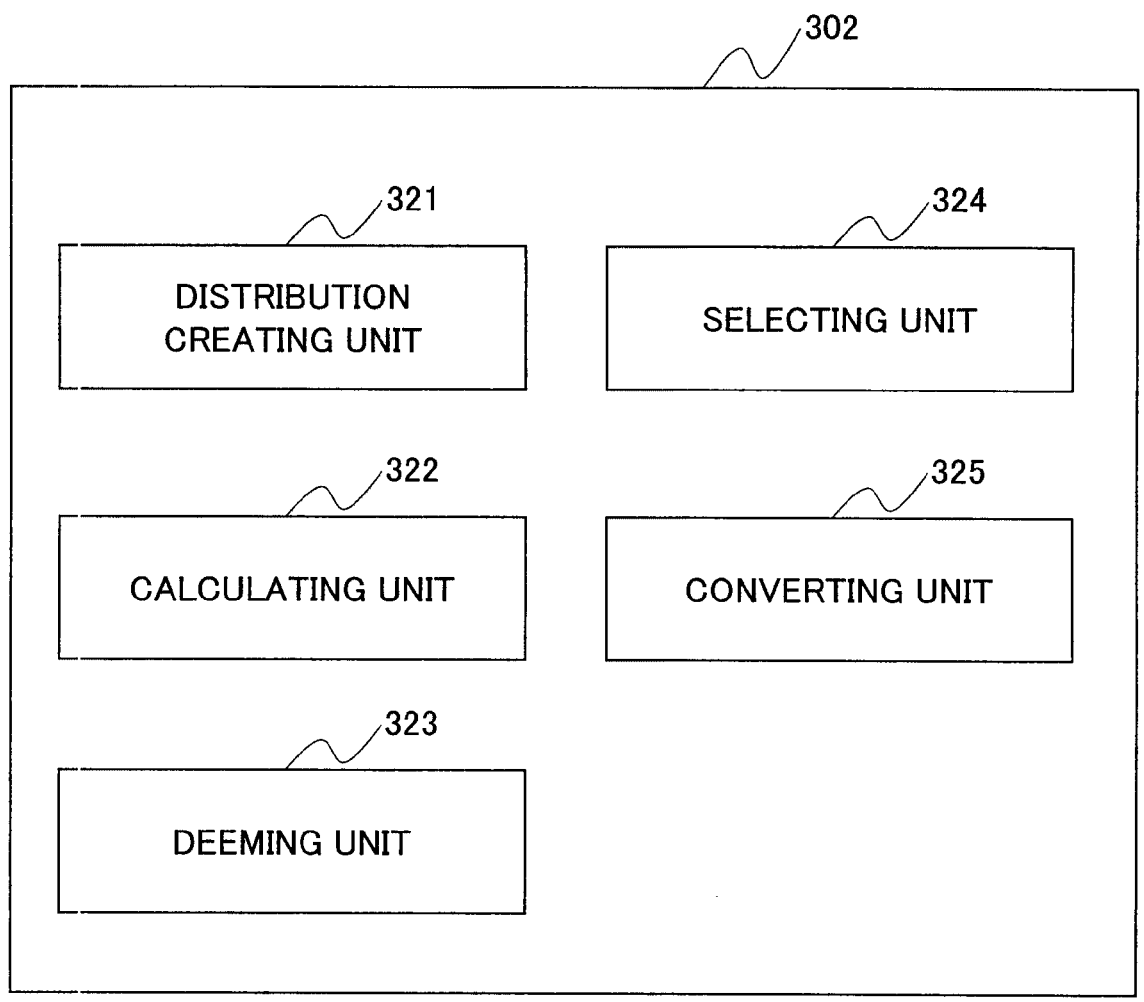
FIG. 4 is a functional block diagram of a deemed background color determining unit.

FIG. 4 is a functional block diagram of the deemed background color determining unit 302. As shown in FIG. 4, the deemed background color determining unit 302 includes a distribution creating unit 321, a calculating unit 322, a deeming unit 323, a selecting unit 324, and a converting unit 325.

The distribution creating unit 321 creates a histogram for each of the color components (R, G, and B) of all pixels in the image data. When the image data is in color, a histogram having 256 gradation levels is created for each of R, G, and B. When the image data is in grayscale, one histogram of brightness is created. Histograms are created in this example; however, in another example, the frequency of each gradation level may be counted instead.

The calculating unit 322 calculates an average x and a standard deviation σ for each histogram created by the distribution creating unit 321.

When only a single color appears in each histogram of R, G, and B, the image data is determined to be blank (i.e., an image data obtained by scanning a blank page), and subsequent processes are not performed. A blank page means that the color is uniform (some noise is allowable), and that the image does not include any distinctive diagrams or characters. It is known from experimental results that a regular blank page has a standard deviation σ of 3 through 5. Thus, if the standard deviation σ is greater than or equal to 10, the image data can be determined to be not blank. Furthermore, if the maximum value and minimum value in each histogram are the same, it means that the image data includes a single color. Thus, the image data is determined to be blank.

The deeming unit 323 identifies the colors within a range of plus/minus the standard deviation σ from the average x (the standard deviation σ and the average x have been calculated by the calculating unit 322), and determines the identified colors to be the deemed background colors. Thus, colors of high frequency in the histogram are determined to be the deemed background colors.

In the above example, the deemed background colors are determined by identifying colors within a range of plus/minus the standard deviation σ from the average x. However, the deemed background colors may be the colors ranking in the top several tens percent (predetermined value) in terms of frequency.

Next, a description is given of the selecting unit 324 and the converting unit 325; however, objects of the present invention may be achieved without the selecting unit 324 or the converting unit 325. In the following description, it is assumed that the selecting unit 324 and the converting unit 325 are included.

The selecting unit 324 selects a histogram having the highest standard deviation σ among the histograms created by the distribution creating unit 321, and determines the selected histogram to be a representative histogram. This selection is effective when the difference in brightness is small between the color of the background (i.e., the sheet) and the colors in the color image.

When a representative histogram is selected by the selecting unit 324, the deeming unit 323 determines the deemed background colors based on only the representative histogram.

When the image data is in 4 bits or 8 bits when the distribution creating unit 321 creates the histograms, the converting unit 325 performs a "process corresponding to full-color conversion" on a palette representing pixels. Specifically, the process corresponding to full-color conversion is for creating a histogram with full-color values based on palette values. It is possible to completely convert the image data into full-color image data; however, even without creating full-color image data, the histogram can be created by using full-color values acquired by performing the process corresponding to full-color conversion. Accordingly, the distribution creating unit 321 can create a histogram for each of the color components (R, G, B), even when the image data is in palette colors.

When creating a histogram, the distribution creating unit 321 counts the average values of four pixels. By smoothing the data in this manner, the impact of noise can be mitigated. Furthermore, the distribution creating unit 321 does not count black dots or white dots included in the image data. Accordingly, objects that are unlikely to be determined as characters can be excluded. Furthermore, the weight of the values counted by the distribution creating unit 321 is to be reduced toward the edges of the image data. For example, the counted values obtained around the edges of the image data may be weighted by 0.2, because characters are less likely to be included around the edges. Accordingly, the weight of the edge parts can be reduced.

When there are dark colors continuously arranged in a sub scanning direction (vertical direction), the distribution creating unit 321 determines such colors as scan noise. Therefore, the values counted at these portions are multiplied by a low coefficient, so as to mitigate the weight of scan noise caused by dust on the CCD.

The reason why the RGB color space is used for creating the histograms is to respond to pages of various colors. If the YCrCb, YUV, or HSV color space was used for creating the histograms, the brightness (Y) component would have the largest deviation in most cases, and therefore the selecting unit 324 would select the brightness histogram as the representative histogram. In this case, the components of chroma difference (Cr, Cb) would not be selected. Therefore, the blank page determination may not be appropriately performed for color originals.

Referring back to FIG. 3, the background color determining unit 303 determines the background color based on the deemed background colors determined by the deemed background color determining unit 302. Specifically, the background color determining unit 303 identifies a color within a range of plus/minus a variability z from an average y of the deemed background colors. The variability z is the larger value between the standard deviation and a predetermined value. The predetermined value may be between zero and 100. Experimental results show that a value of around 50 is reasonable as the predetermined value.

The pixel counting unit 304 counts the pixels having the color(s) of the characters (character colors), assuming that the characters are in any color other than the background color determined by the background color determining unit 303. Next, when the pixels having the character colors are counted, the pixel counting unit 304 calculates the ratio of the number of pixels in character colors to the total number of pixels (hereinafter, also referred to as character appearance ratio). The character appearance ratio may be calculated by the blank page determining unit 305 described below.

When the image data is long, the image data may be converted into a standard length (aspect ratio≦1.5). Specifically, when the aspect ratio of the actual length "s" of the image data exceeds an aspect ratio t (t=1.5), the character appearance ratio is multiplied by s/t, to increase the value of the character appearance ratio. If the aspect ratio was high, the area would be large, and therefore the character appearance ratio would decrease relative to the area, which may cause erroneous determinations. The above multiplication is performed to prevent such an erroneous determination. That is, even if the ratio of the characters in the entire image was low, importance (weight) can be placed on the characters.

Another method performed when the image data is long is to divide the image data in units of A4 size sheets, and to calculate the character appearance ratio for each section obtained by dividing the image data. Next, the largest value among the calculated character appearance ratios is used for the blank page determination. As the character appearance ratio is obtained for each of the sections, the character appearance ratio is prevented from decreasing due to the large area.

When the ratio of characters in the entire image calculated by the pixel counting unit 304 is less than a predetermined value, the blank page determining unit 305 determines that the image data is blank. When the ratio of characters in the entire image calculated by the pixel counting unit 304 is greater than or equal to the predetermined value, the blank page determining unit 305 determines that the image data is not blank. The predetermined value may be, for example, 0.001%, 0.05%, or 0.1%, which may be changed. For example, the predetermined value may initially be 0.05%, and when there are many erroneous determinations, the predetermined value may be changed to 0.001% so that the determinations are made more precisely. When the process is actually executed with a program, it is time-consuming to perform computations with a number including a decimal point, and therefore the predetermined value is multiplied by a predetermined multiple (for example, 1,000,000 times), so that the blank page determination can be performed with integral numbers.

The image DB 306 eliminates image data that is determined to be blank by the blank page determining unit 305, and stores only image data that is not blank.

The image processing system having the above-described configuration can appropriately respond to various kinds of image data, and can therefore improve the blank page detection rate.

The following is another method of determining the background color. The deemed background color determining unit 302 obtains the center of gravity in a RGB three dimensional space, identifies the colors within a predetermined distance from the obtained center of gravity, and determines the identified colors as the deemed background colors. Next, the background color determining unit 303 obtains the center of gravity in a RGB three dimensional space based on the deemed background colors, identifies a color within a predetermined distance from the obtained center of gravity, and determines the identified color as the deemed background color. Accordingly, a vector of the character direction with respect to the background is obtained, and the background and the characters can be separated at a plane perpendicular to the vector, instead of simply separating the background and the characters in terms of distance. Accordingly, needless noise can be eliminated.

In the above example, the deemed background color determining unit 302 calculates an average value to determine the deemed background colors. In another example, the deemed background color determining unit 302 may use a gradation level corresponding to the highest frequency (highest peak) in the histogram instead of using an average value. In yet another example, the deemed background color determining unit 302 may use a median instead of using an average value.

<Histogram>

Figure 5A:
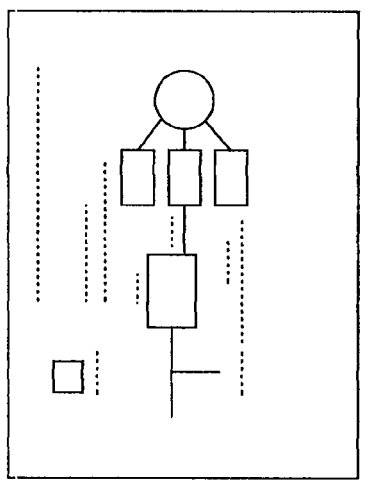
FIGS. 5A through 5D illustrate examples of images for which blank page determination is performed.
Figure 5B:
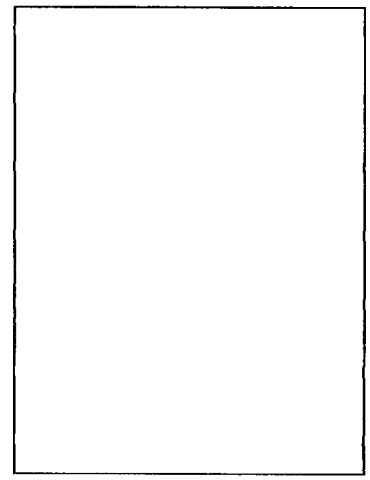
Figure 5C:
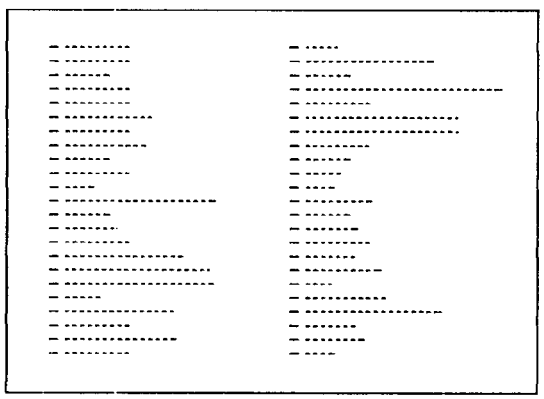
Figure 5D:
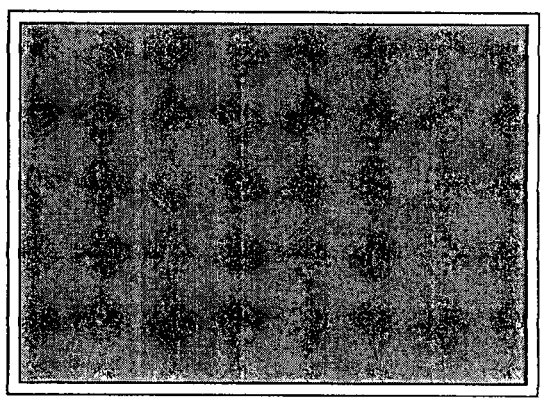

Next, a description is given of a histogram created by the distribution creating unit 321, with reference to FIGS. 5A through 9. FIGS. 5A through 5D illustrate examples of images for which blank page determination is performed. FIG. 5A illustrates an image (image 1) including colorful characters and colorful diagrams. FIG. 5B illustrates a blank image (image 2). FIG. 5O illustrates an image (image 3) including black characters. FIG. 5D illustrates a color image (image 4) without any characters or diagrams. FIGS. 6A through 6D illustrate histograms created when the images illustrated in FIGS. 5A through 9 are color-scanned or grayscale-scanned.

Figure 6A:
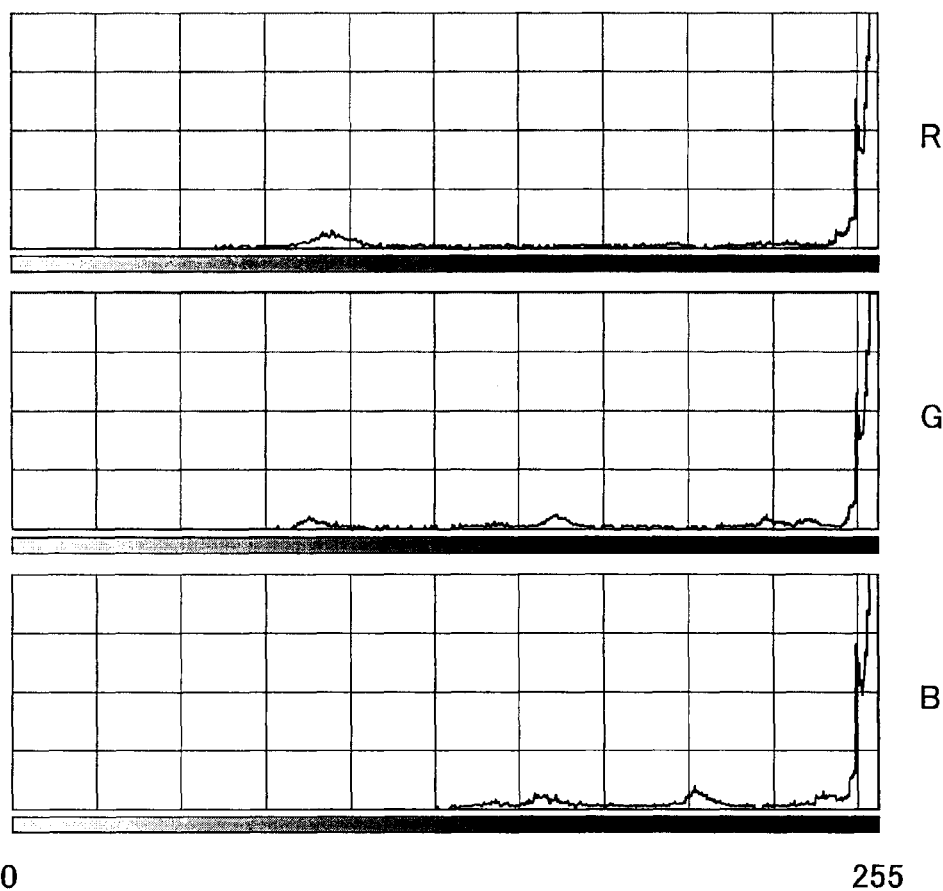
FIGS. 6A and 6B illustrate histograms of image 1.
Figure 6B:
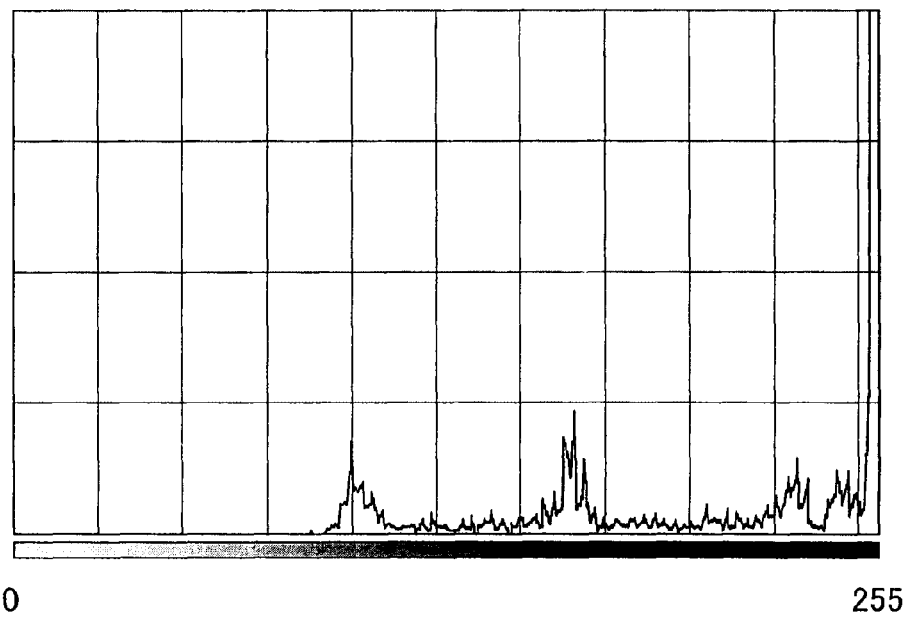

FIGS. 6A and 6B illustrate histograms of image 1. FIG. 6A illustrates histograms of color components (R, G, B), which are created when image 1 has been color-scanned. FIG. 6B illustrates a histogram created when image 1 has been grayscale-scanned. In the histograms shown in FIGS. 6A and 6B, there are peaks located sporadically, which correspond to the parts where the diagrams are located.

Figure 7A:
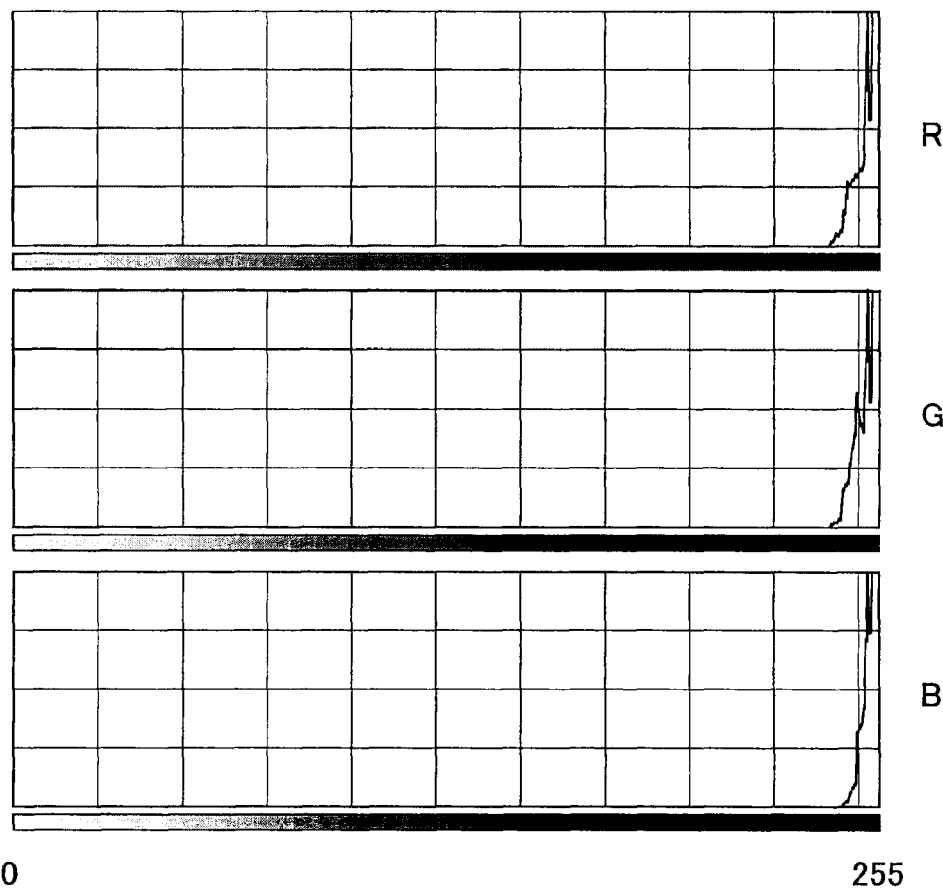
FIGS. 7A and 7B illustrate histograms of image 2.
Figure 7B:
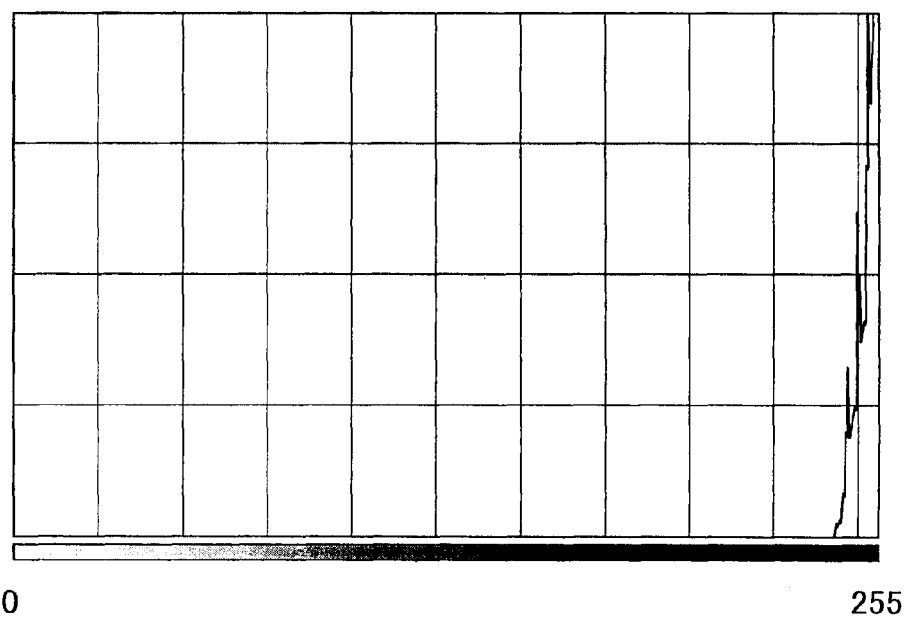

FIGS. 7A and 7B illustrate histograms of image 2. FIG. 7A illustrates histograms of color components (R, G, B), which are created when image 2 has been color-scanned. FIG. 7B illustrates a histogram created when image 1 has been gray-scale-scanned. As shown in FIGS. 7A and 7B, each of the histograms has a narrow dispersion, and has a high peak at a particular gradation level.

Figure 8A:
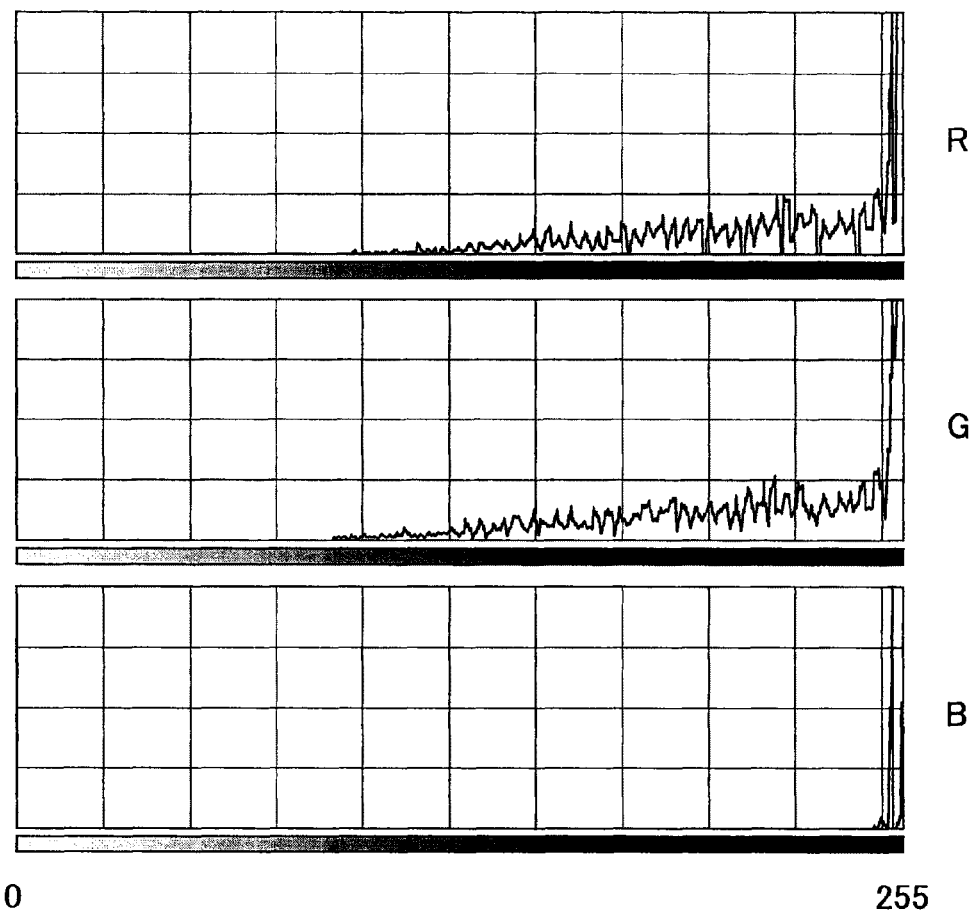
FIGS. 8A and 8B illustrate histograms of image 3.
Figure 8B:
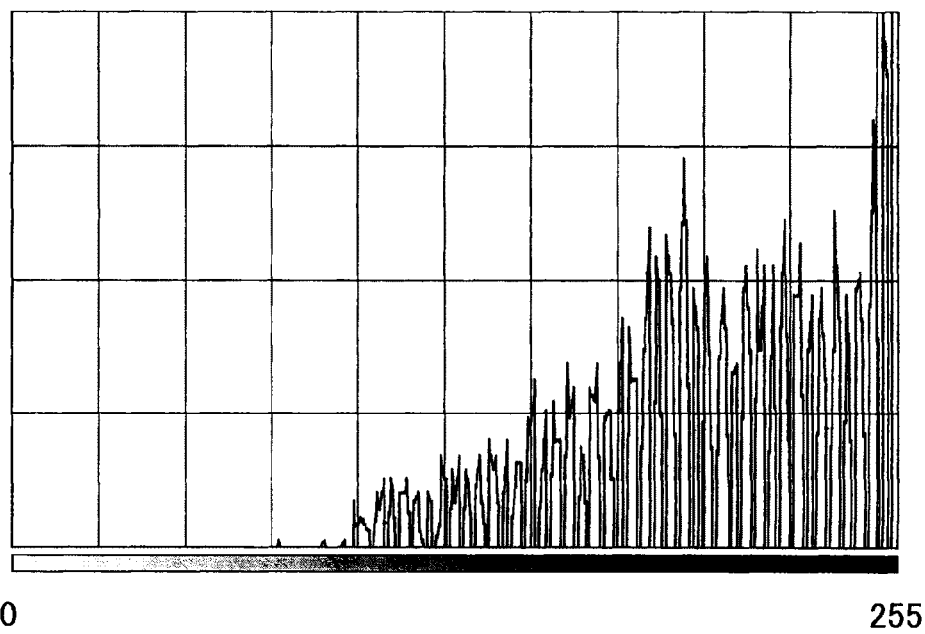

FIGS. 8A and 8B illustrate histograms of image 3. FIG. 8A illustrates histograms of color components (R, G, B), which are created when image 3 has been color-scanned. FIG. 8B illustrates a histogram created when image 3 has been gray-scale-scanned. In the histograms shown in FIGS. 8A and 8B, there are peaks located sporadically, which correspond to the parts where the characters are located.

Figure 9A:
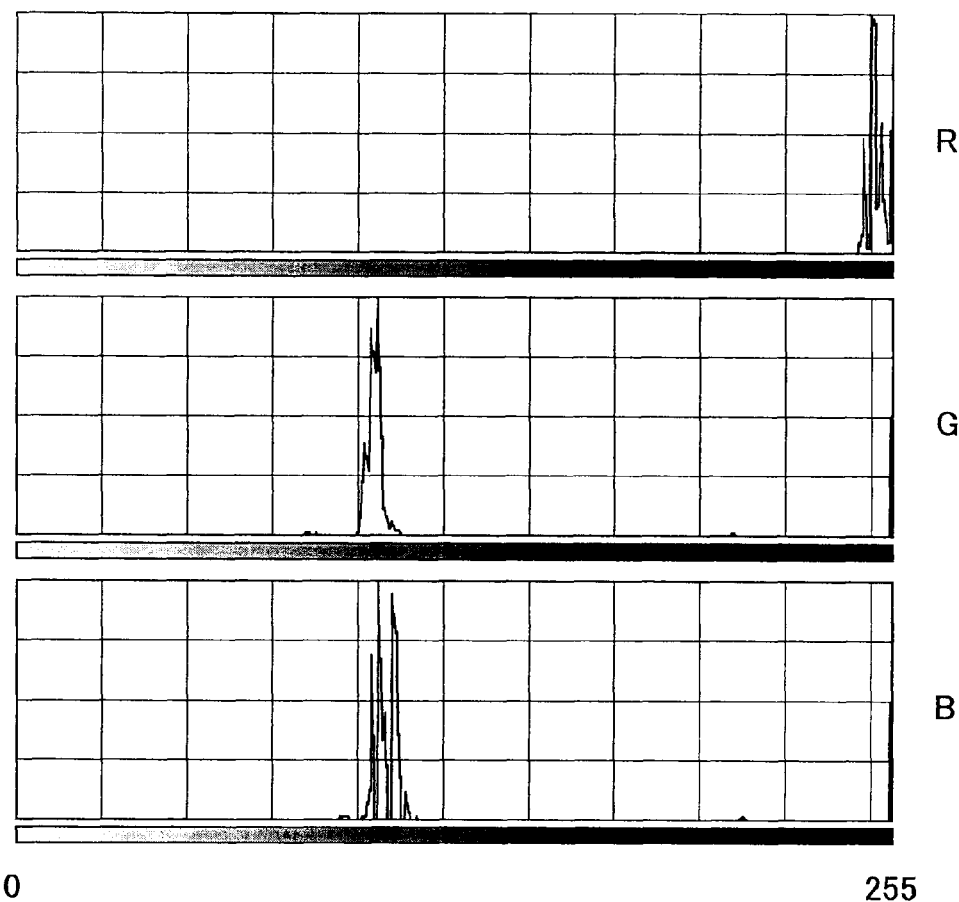
FIGS. 9A and 9B illustrate histograms of image 4.
Figure 9B:
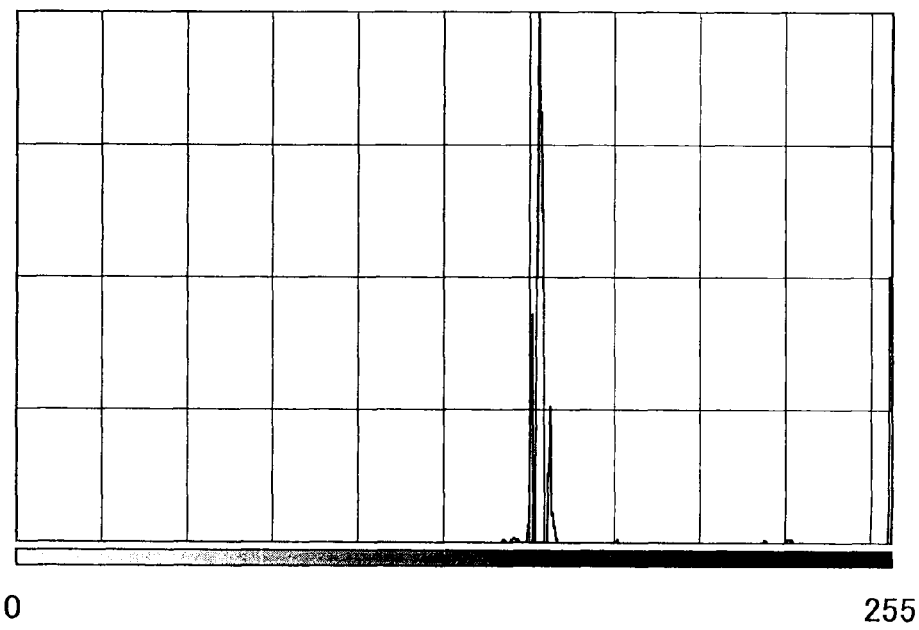

FIGS. 9A and 9B illustrate histograms of image 4. FIG. 9A illustrates histograms of color components (R, G, B), which are created when image 4 has been color-scanned. FIG. 9B illustrates a histogram created when image 4 has been gray-scale-scanned. As shown in FIGS. 9A and 9B, the frequency is counted at the gradation level corresponding to the color of the image. In an embodiment of the present invention, the deemed background colors are first determined with the use of the histograms shown in FIGS. 6A through 9B, and then the background color is determined from among the deemed background colors.

<Experimental Results>

FIG. 10 indicates experimental results 1 according to the first embodiment. First, a description is given of the images used for the blank page determination.

Image A: blank image in light blue
Image B: image formed by adding small characters to the center part of image A
Image C: blank image in gray
Image D: blue image including characters "ASC" in slightly darker blue than background
Image E: image in which background and characters have the same brightness
Image F: image in which a character "E" is inverted
Image G: image with red background with small characters at the top Next, a description is given of blank page determination methods performed in the experiment. Present invention method: blank page determination method of first embodiment described above (a representative histogram is selected, a predetermined value of 50 is used for determining the background color, and a predetermined value of 0.05% is used for blank page determination)
Conventional technology 1 method: Ridoc Document Router (existing blank page determination method)
Conventional technology 2 method:
  (1) Specify the standard color, the deviation from standard color, a determination threshold (%), and a peripheral part neglect region (%) (there are stored in a parameter file) (note: peripheral part neglect region is the peripheral part of image to be disregarded) for example: ±128 from RGB=0x000000 (jet-black), determination threshold (%)=105%, peripheral part=disregard 3%
  (2) Confirm whether colors of pixels in center of image (excluding peripheral part of image) are included among the standard color or the colors within the deviation from the standard color (standard color+deviation), which are specified in (1), and count the number of pixels included in standard color+deviation
  (3) Calculate ratio of pixels included in standard color+ deviation to all pixels in process target
  (4) Determine whether calculation result of (3) exceeds determination threshold (%)

In the conventional technology 2 method, the colors can be specified; however, in this method, the sensitivity to colors is not high, and in particular, the handling of intermediate colors is not good. For example, when the color of the characters and the color of the background are different colors but have the same brightness, the difference in color may not be properly detected. Therefore, the inventors of the present application invention improved the conventional technology 2 method by adding the following steps to solve this problem.

Improved conventional technology 2 method:
  (5) Create histograms of chroma differences (Cb, Cr), and obtain standard deviation of each histogram
  (6) When the standard deviation of either histogram of chroma differences (Cb, Cr) is:
    greater than a threshold (for example, 8), the image is not a blank page (variability of colors is high)
    less than a threshold (for example, 8), the image is a blank page (variability of colors is low)

Accordingly, with the improved conventional technology 2 method, the sensitivity to colors is improved compared to the original conventional technology 2 method. However, with the improved version of the conventional technology 2 method, errors may still occur when the area of the characters is extremely small.

In FIG. 10, the hatched parts indicate where erroneous determinations have been made. FIG. 10 indicates that erroneous determinations have been made for some images with the conventional technology 1 method, the conventional technology 2 method, and the improved conventional technology 2 method. Meanwhile, with the present invention method, there were no erroneous determinations made for any of the images, and blank pages have been properly detected. Furthermore, with respect to processing time, the blank page determination can be performed faster by the present invention method than any of the conventional technology 1 method, the conventional technology 2 method, and the improved conventional technology 2 method.

FIGS. 11A and 11B indicate another experimental result. FIGS. 11A and 11B indicate experimental results 2 according to the first embodiment. A description is given of details of the experiment of FIGS. 11A and 11B.

Images used in experiment: Double-sided scanning is performed on 20 pages of originals by A4-200 dpi (half are blank)
Present invention method: blank page determination method of first embodiment described above (a representative histogram is selected, a predetermined value of 50 is used for determining the background color, and a predetermined value of 0.05% is used for blank page determination)
Conventional technology 3 method: AutoStore (NSi) Experiment conditions: Scan each page in a vertical or horizontal direction, perform blank page determination by the present invention method and the conventional technology 3 method, and compare the results FIG. 11A indicates blank page determination results of the present invention method and the conventional technology 3 method. FIG. 11B indicates the processing time of the present invention method and the conventional technology 3 method. As shown in FIG. 11A, with the present invention method, blank pages can be properly determined in both vertical scanning and horizontal scanning. Meanwhile, with the conventional technology 3 method, erroneous determinations have been made in both vertical scanning and horizontal scanning. Furthermore, FIG. 11B indicates that blank page determination can be performed faster by the present invention method than by the conventional technology 3 method.

As shown in FIGS. 10, 11A, and 11B, by performing blank page determination, the blank page detection rate can be improved, and processing time can be reduced.

<Process Concept>

Figure 12:
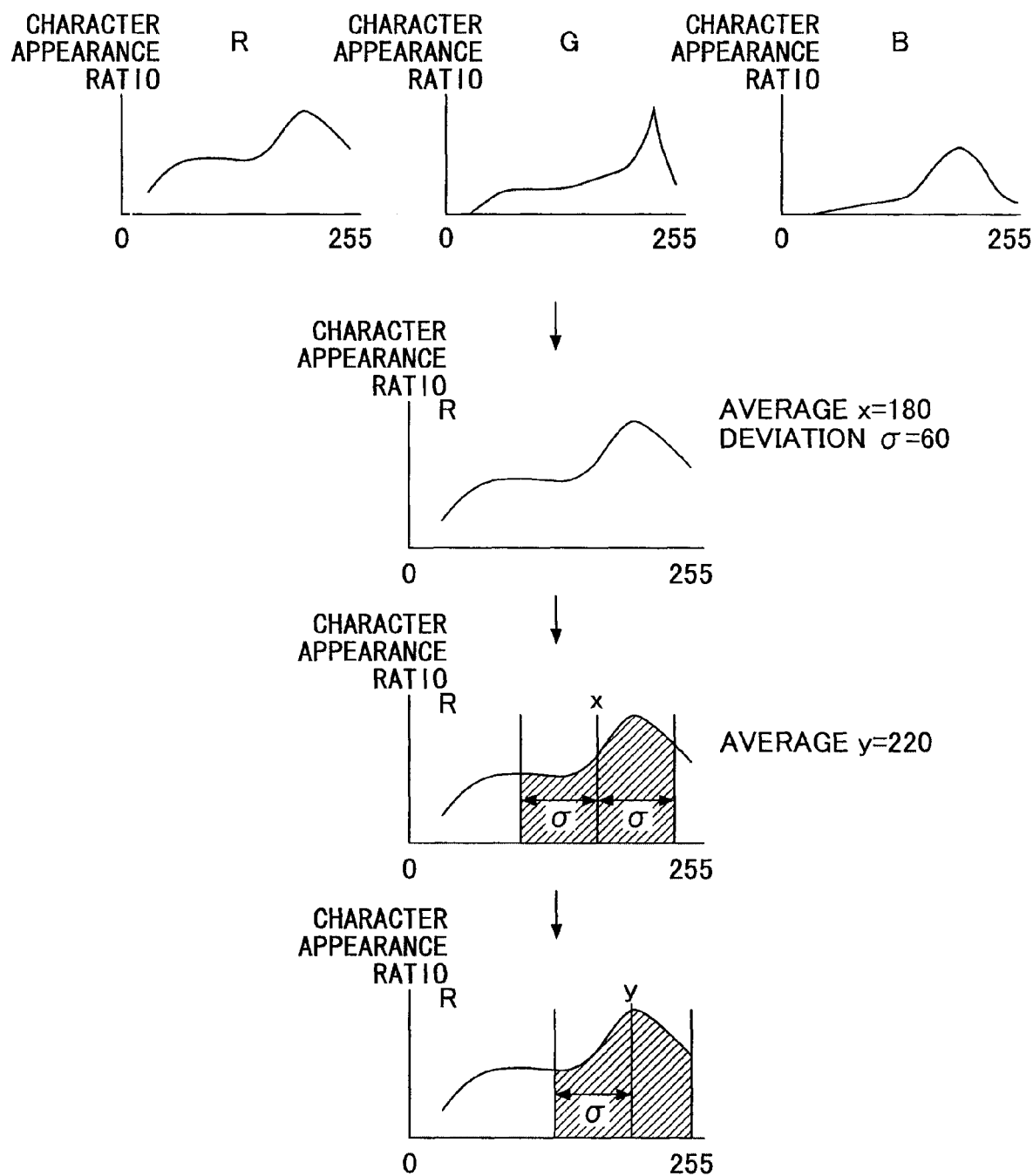
FIG. 12 is for describing a process concept according to the first embodiment.

Next, the process concept of the first embodiment is described with reference to FIG. 12. FIG. 12 is for describing a process concept according to the first embodiment. As shown in FIG. 12, three histograms for RGB components are created based on the image data.

Then, among the histograms for RGB components, the histogram with the widest dispersion (largest standard deviation $\sigma$) is selected. In the example shown in FIG. 12, it is assumed that the histogram for R has the largest standard deviation $\sigma$. Next, the average x and the standard deviation $\sigma$ of the histogram for R are used to determine the range of the deemed background colors. In the example shown in FIG. 12, the range of the deemed background colors is within a range of plus/minus the standard deviation $\sigma$ from the average x (180±60).

Next, the average y of the deemed background colors is calculated. In the example shown in FIG. 12, it is assumed that y=220. Assuming that the predetermined value used for determining the variability is 50, the standard deviation $\sigma$=60 and the predetermined value 50 are compared, and the larger value is determined to be the variability. Once the variability is determined, the range of background color is determined. In the example shown in FIG. 12, the range of the background color is average y±variable (220±60). However, the maximum value is 255.

Thus, in the example shown in FIG. 12, the range of background colors is 160 through 255, and the color of characters is outside the range of background colors, and therefore the range of the character colors is 0 through 159. The number of pixels included in this range of character colors is counted (or the number of pixels in the range of background colors may be counted, and the counted number may be subtracted from the total number of pixels), to calculate the character appearance ratio.

Finally, the character appearance ratio is compared with a predetermined value (e.g., 0.05%) used for blank page determination, and when the character appearance ratio exceeds the predetermined value, it is determined that the image is not blank.

<Operation>

Figure 13:
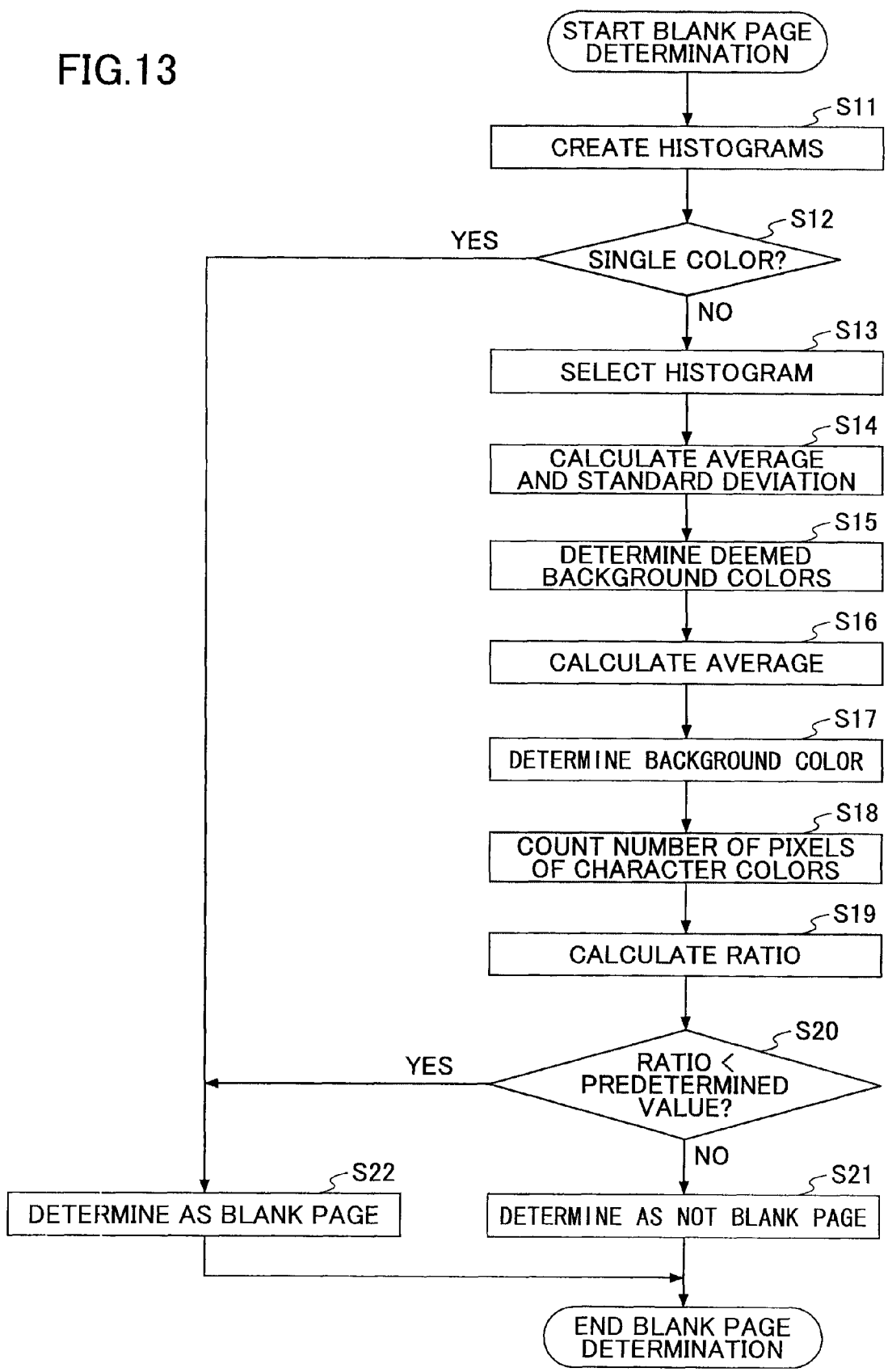
FIG. 13 is a flowchart of a blank page determination process according to the first embodiment.

FIG. 13 is a flowchart of a blank page determination process according to the first embodiment. As shown in FIG. 13, in step S11, the distribution creating unit 321 creates histograms for RGB based on the acquired image data.

In step S12, the distribution creating unit 321 determines whether each of the created histograms for RGB corresponds to a single color. This is done by determining whether maximum value=minimum value is satisfied in each histogram. If maximum value=minimum value is satisfied in each histogram, it means that the image data is in a single color. When the determination result in step S12 is YES (single color), the process proceeds to step S22. When the determination result in step S12 is NO (not single color), the process proceeds to step S13.

In step S13, the selecting unit 324 selects the histogram having the highest standard deviation $\sigma$ from among the three histograms for RGB. In step S14, the calculating unit 322 calculates the average x and the standard deviation $\sigma$ of the histogram selected by the selecting unit 324.

In step S15, the deeming unit 323 determines the deemed background colors (x±$\sigma$) based on the average x and the standard deviation $\sigma$ calculated by the calculating unit 322.

In step S16, the background color determining unit 303 calculates the average y of the deemed background colors determined by the deeming unit 323. In step S17, the background color determining unit 303 compares the standard deviation $\sigma$ with a predetermined value (for example, 50), and determines the larger value as the variability. Next, the background color determining unit 303 identifies a color within a range of plus/minus the variability (the determined value) from the average y, and determines the identified color as the background color. It is assumed that the minimum value is 0 and the maximum value is 255 for both the deemed background colors and the background color.

In step S18, the pixel counting unit 304 counts the number of pixels of character colors, assuming that any color other than the background color is a character color. The pixel counting unit 304 may count the number of pixels of the background color, and subtract the counted color from the total number of pixels in the image to obtain the number of pixels of character colors.

In step S19, the blank page determining unit 305 calculates the ratio of the number of pixels of character colors counted by the pixel counting unit 304 to the total number of pixels in the image.

In step S20, the blank page determining unit 305 determines whether the calculated character appearance ratio is less than a predetermined value. When the determination result at step S20 is YES (less than predetermined value), the process proceeds to step S22. When the determination result at step S20 is NO (greater than or equal to predetermined value), the process proceeds to step S21.

In step S21, the blank page determining unit 305 determines that the acquired image data is not blank, and ends the blank page determination process. In step S22, the blank page determining unit 305 determines that the acquired image data is blank, and ends the blank page determination process.

According to the first embodiment, it is possible to appropriately respond to various kinds of image data so that the blank page detection rate can be improved.

Second Embodiment

Next, a description is given of an image processing system according to a second embodiment of the present invention. In the second embodiment, the image data is divided, and blank page determination is performed in units of sections formed by dividing the image data (into division units), so that blank page determination can be performed at high speed.

<Function Configuration>

Figure 14:
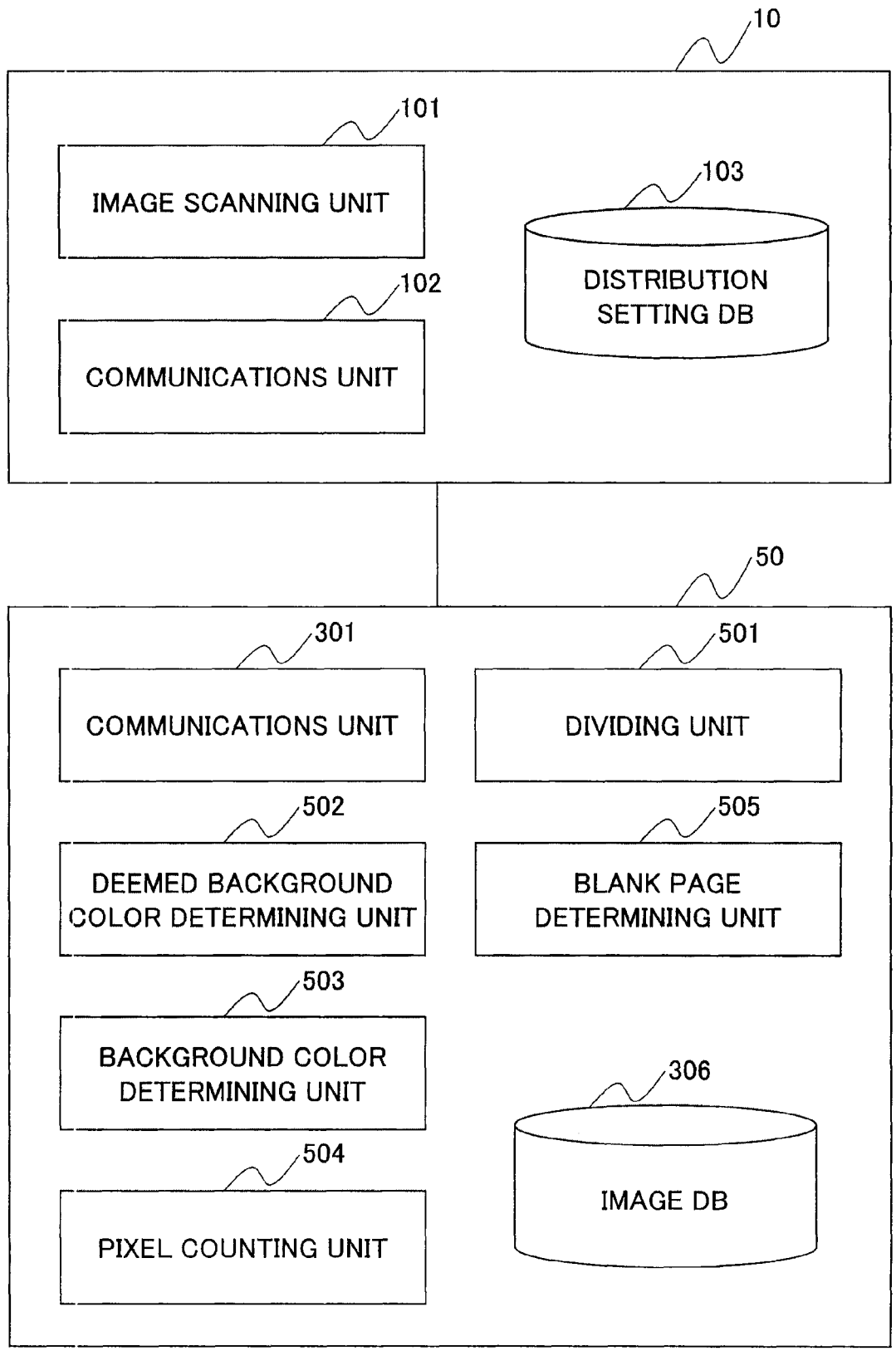
FIG. 14 is a functional block diagram of the MFP and an image processing server according to a second embodiment of the present invention.

FIG. 14 is a functional block diagram of the MFP 10 and an image processing server 50 according to the second embodiment. In FIG. 14, the same functions as those of FIG. 3 are denoted by the same reference numerals and are not further described.

As shown in FIG. 14, the image processing server 50 includes the communications unit 301, a dividing unit 501, a deemed background color determining unit 502, a background color determining unit 503, a pixel counting unit 504, a blank page determining unit 505 (deciding unit), and the image DB 306.

The dividing unit 501 divides the image data acquired by the communications unit 301 into predetermined sections (division units). The predetermined sections may be in units of lines, or in units of rectangular sections. In this example, the image is divided into lines and every eleventh line is read. In an embodiment of the present invention, the lines are preferably scanned in an irregular manner, and therefore the number of lines is eleven, which is a reasonably large prime number. However, it goes without saying that the present invention is not limited to reading every eleventh line of the image data.

The deemed background color determining unit 502 sequentially reads the sections (division units) of the image data divided in units of lines by the dividing unit 501, renews the histograms for each of the colors (R, G, B), uses the renewed histograms to identify the colors within a predetermined range, and determines the identified colors as deemed background colors in the sections. That is, colors that most frequently appear in the image data (in the division unit) are deemed as the deemed background colors.

The background color determining unit 503 determines the background color based on the deemed background colors in the division unit, whereby the deemed background colors have been determined by the deemed background color determining unit 502. The method of determining the background color is the same as the first embodiment, and is thus not further described.

The pixel counting unit 504 counts the number of pixels having character colors in the division unit, assuming that any color other than the background color determined by the background color determining unit 503 is a character color. Next, when the number of pixels of character colors has been counted, the pixel counting unit 504 calculates the character appearance ratio, i.e., the ratio of the counted number of pixels of character colors to the total number of pixels scanned in the first round of scanning the image in units of lines.

The blank page determining unit 505 determines that the image is blank when the character appearance ratio calculated by the pixel counting unit 504 is less than a predetermined value, and determines that the image is not blank when the character appearance ratio is greater than or equal to the predetermined value. Similar to the first embodiment, the predetermined value may be, for example, 0.001%, 0.05%, or 0.1%, which may be changed.

When the image is determined to be blank, the blank page determining unit 505 instructs the deemed background color determining unit 502 to scan the next set of lines and renew the histogram. In the second embodiment, the above described blank page determination method is repeated until the image is determined as not blank, or until the entire image has been scanned.

Figure 15:
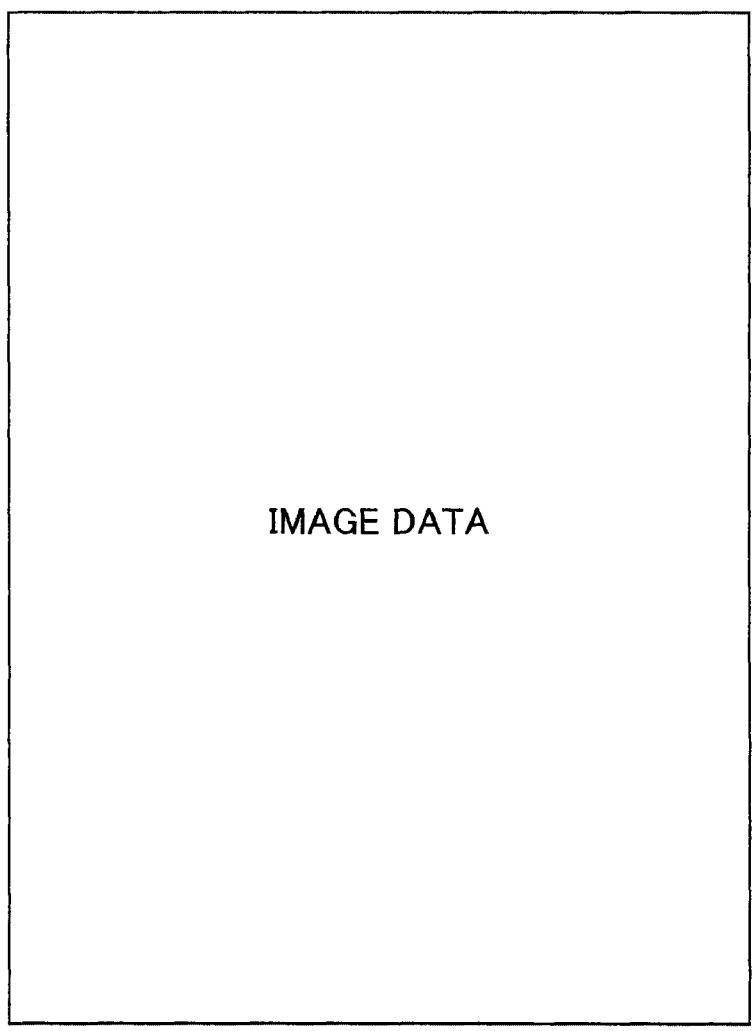
FIG. 15 illustrates an example of scanning the image in units of lines.

FIG. 15 illustrates an example of scanning the image in units of lines. As shown in FIG. 15, the histogram is renewed every time a division unit (section) of the image data has been scanned by reading every eleventh line. First in the first round of scanning the image, the 1st line, 12th line, 23rd line, . . . are read, and a histogram is created based on the read pixels. Next, the blank page determining unit 505 performs blank page determination based on the created histogram. When the blank page determining unit 505 determines that the division unit is blank, the second round of scanning the image is performed. In the second round of scanning, the 2nd line, the 13th line, the 24th line, . . . are read, and the histogram is renewed based on the read pixels. Subsequently, the above-described process is repeated until the image is determined as not blank, or until the entire image has been scanned.

The blank page determining unit 505 performs blank page determination by multiplying the predetermined value used for determination by a coefficient. For example, when the image is scanned at every eleventh line, a coefficient of 10 is used for the first blank page determination, a coefficient of 9 is used for the second blank page determination, a coefficient of 8 is used for the third blank page determination, and so forth, i.e., the coefficient is decreased by one every additional time the blank page determination is performed. When the number of scanned pixels is small, the character appearance ratio may be erroneously high, thereby causing incorrect determinations. Thus, when the number of scanned pixels is small, the condition for determining whether the data is not blank is made more stringent by using a larger predetermined value for blank page determination. As the number of times of scanning increases, the number of scanned pixels increases, and therefore the coefficient is gradually decreased, so that the predetermined value used for the blank page determination gradually approaches the original predetermined value.

As described above, when the image data is determined as not blank at an early stage (when the number of times of scanning is small), the blank page determination ends. Therefore, the time required for the blank page determination process may be reduced.

<Operation>

Figure 16:
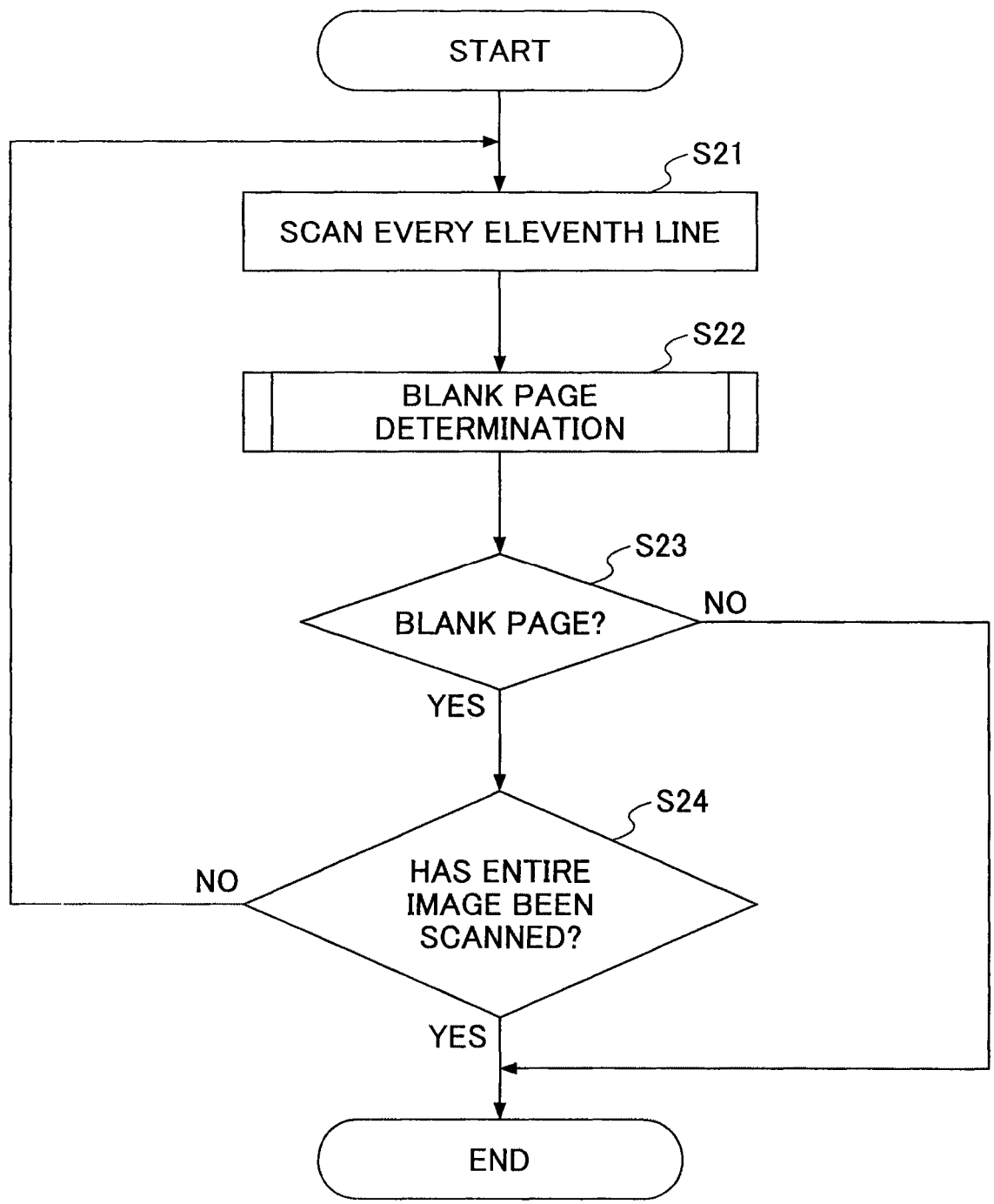
FIG. 16 is a flowchart of a blank page determination process according to the second embodiment.

FIG. 16 is a flowchart of a blank page determination process according to the second embodiment. As shown in FIG. 16, in step S21, the dividing unit 501 divides the image data into lines and the deemed background color determining unit 502 scans every eleventh line of the image data.

In step S22, the blank page determination process indicated in FIG. 13 is performed on the scanned pixels. In step S23, the blank page determining unit 505 determines whether the scanned pixels are blank. When the determination result at step S23 is NO (not blank), the process ends. When the determination result at step S23 is YES (blank), the process proceeds to step S24.

In step S24, the blank page determining unit 505 determines whether the entire image data has been scanned. When the determination result at step S24 is YES (entire image has been scanned), the process ends. When the determination result at step S24 is NO (entire image has not yet been scanned), the process returns to step S21, and the next set of lines is scanned.

According to the second embodiment, the image data is divided and blank page determination is sequentially performed for each of the division units, and therefore the blank page determination can be performed at high speed.

Third Embodiment

Next, a description is given of an image processing system according to a third embodiment of the present invention. In the third embodiment, a process of removing noise (preprocess) is performed to improve the precision of blank page determination.

<Function Configuration>

Figure 17:
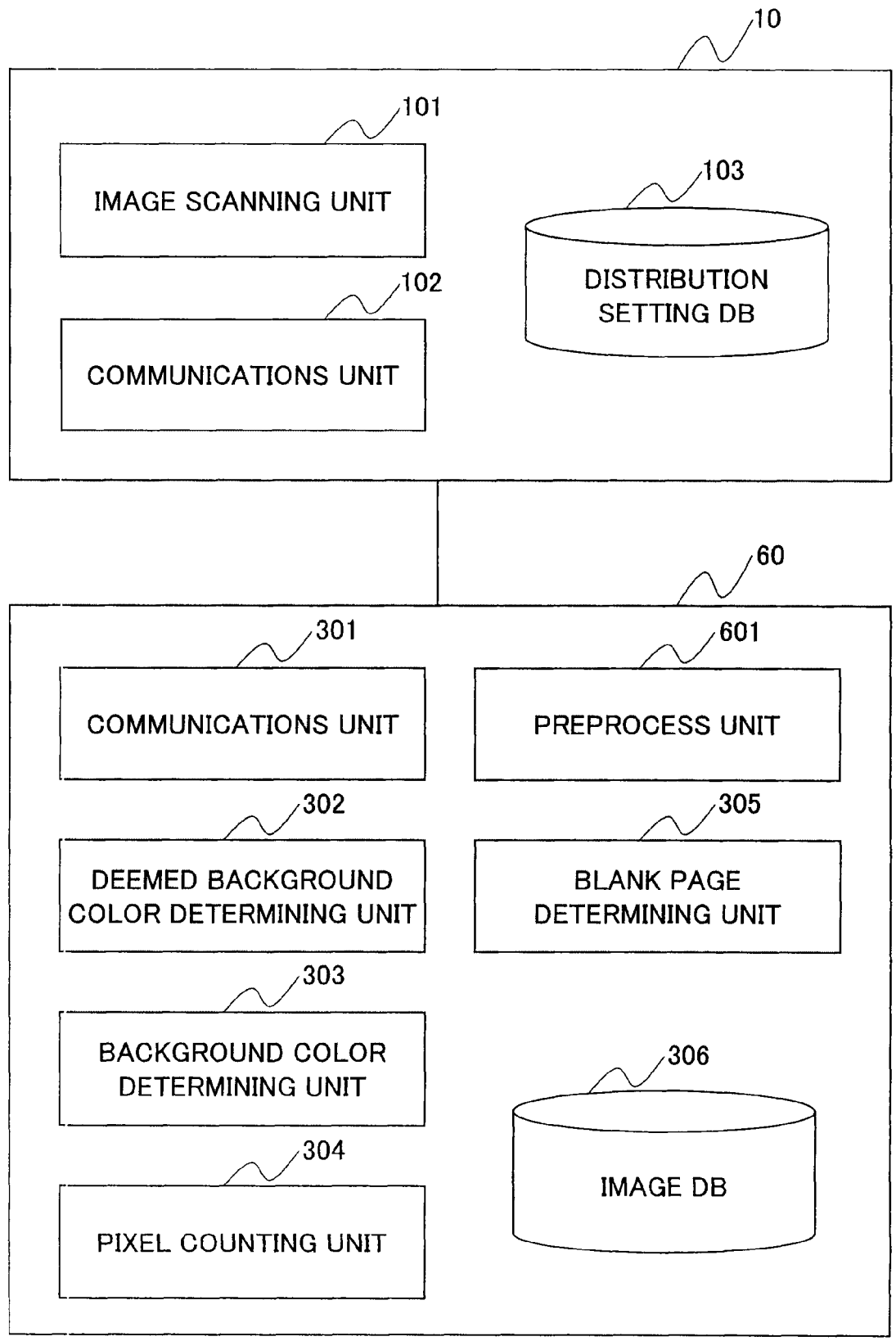
FIG. 17 is a functional block diagram of the MFP and an image processing server according to a third embodiment of the present invention.

FIG. 17 is a functional block diagram of the MFP 10 and an image processing server 60 according to the third embodiment. In FIG. 17, the same functions as those of FIG. 3 are denoted by the same reference numerals and are not further described. As shown in FIG. 17, in the third embodiment, a preprocess unit 601 is added to the functional configuration of the first embodiment.

The preprocess unit 601 performs image processing operations on the image data acquired by the communications unit 301, before the process of the deemed background color determining unit 302 is performed. The image processing operation performed by the preprocess unit 601 may be, for example, removing noise, punching holes, and removing peripheral noise. The process of removing peripheral noise is for removing noise such as black streaks or shadows formed at peripheral parts of the image, caused due to a distortion of the sheet during the scanning process or due to the mechanism of the scanning device.

Furthermore, when the image data is in color or grayscale, the preprocess unit 601 may perform image processing operations such as smoothing, real time thresholding, and eliminating show-through of an image on the other side of the sheet. The image processing operations may be selected by the user and set in advance, or may be selected every time the blank page determination is performed.

According to the third embodiment, preprocessing is performed according to the user's selection, thereby improving the precision of the blank page determination process.

Fourth Embodiment

Next, a description is given of an image processing system according to a fourth embodiment of the present invention. In the fourth embodiment, a description is given of the process of distributing the image data that has undergone blank page determination.

<Function Configuration>

Figure 18:
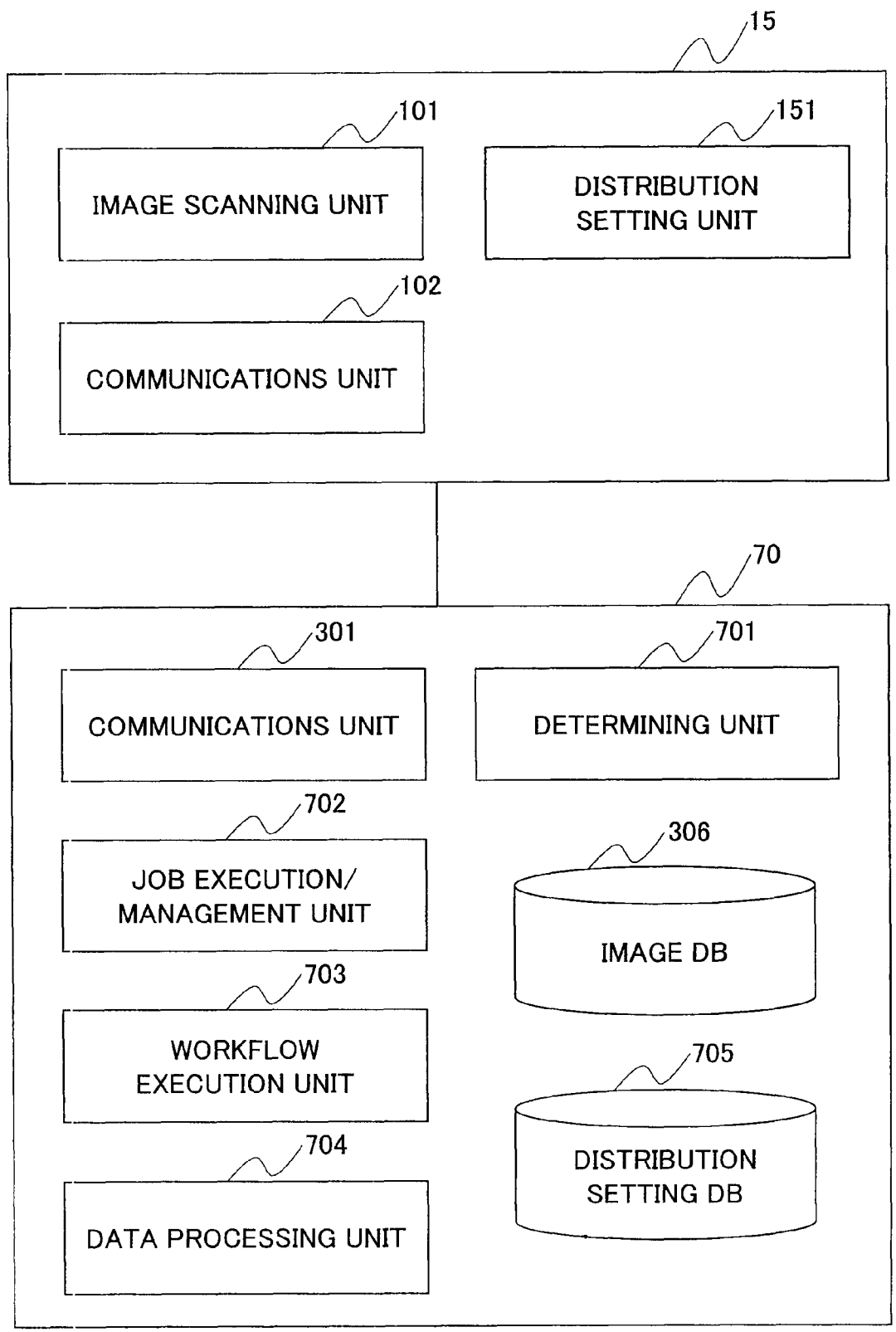
FIG. 18 is a functional block diagram of an MFP and an image processing server according to a fourth embodiment of the present invention.

FIG. 18 is a functional block diagram of an MFP 15 and an image processing server 70 according to the fourth embodiment. In FIG. 18, the same functions as those of FIG. 3 are denoted by the same reference numerals and are not further described. As shown in FIG. 18, in the fourth embodiment, the MFP 15 includes a distribution setting unit 151, and the image processing server 70 includes a determining unit 701, a job execution/management unit 702, a workflow execution unit 703, a data processing unit 704, and a distribution setting DB 705.

The determining unit 701 includes the functions of the deemed background color determining unit 302, the background color determining unit 303, the pixel counting unit 304, and the blank page determining unit 305 (deciding unit), and performs blank page determination. The determining unit 701 may not only perform the blank page determination described in the first embodiment, but also the blank page determination described in the second and third embodiments.

The distribution setting unit 151 of the MFP 15 displays a workflow selection screen page on an operations panel, and detects the workflow selected by the user. The distribution setting unit 151 also acquires distribution parameters in the workflow. The distribution parameters are acquired by causing the user to input and/or select parameters in a setting screen page. The distribution parameters are, for example, an e-mail address of the destination or setting values required for image conversion.

The distribution setting unit 151 also detects whether a chapter division mode for dividing the image data into chapters has been selected for the image data acquired by a scanning process of the image scanning unit 101. The distribution setting unit 151 may also detect whether the above-described blank page determination is to be performed, or the blank page determination may be set as a default setting in the image data acquired by the scanning process. In the following description, it is assumed that blank page determination is set as a default setting.

The distribution setting unit 151 sends, to the image processing server 70 via the communications unit 102, identification information of the selected workflow, distribution parameters pertaining to the workflow, and information indicating the chapter division mode if the chapter division mode is detected, together with the scanned image data.

Figure 19:
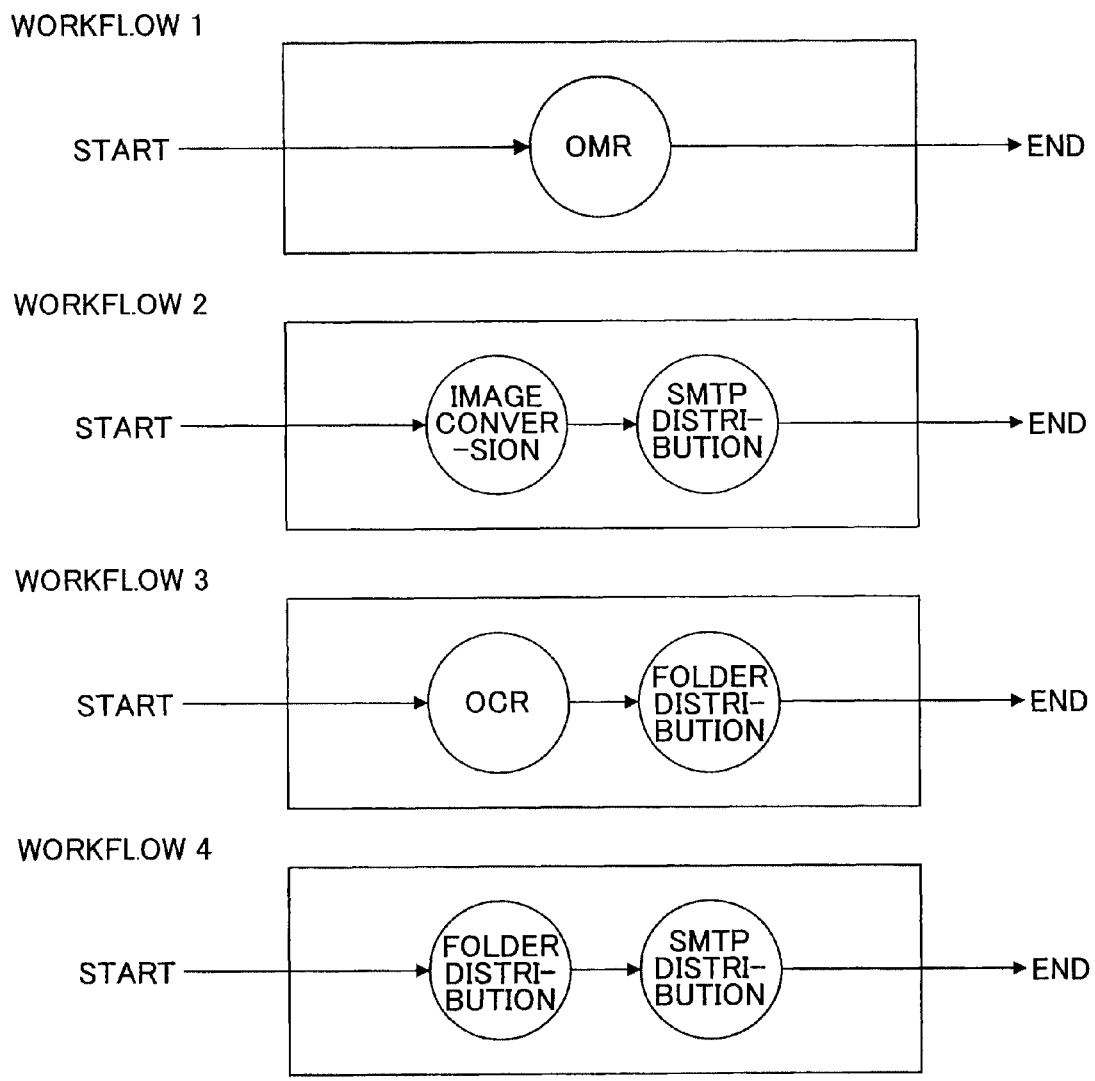
FIG. 19 illustrates examples of workflows.

A description is given of a workflow. FIG. 19 illustrates examples of the workflow. A workflow 1 shown in FIG. 19 performs OMR (Optical Mark Recognition). A workflow 2 performs image conversion and SMTP distribution. A workflow 3 performs an OCR process and folder distribution. A workflow 4 performs folder distribution and SMTP distribution. A workflow corresponds to a distribution process that is a combination of one or more processes (plug-ins) among an input plug-in, an image conversion plug-in, and an output (distribution) plug-in.

Referring back to FIG. 18, a description is given of the image processing server 70. The job execution/management unit 702 stores, in the image DB 306, distribution parameters and image data received from the MFP 15 as jobs, and instructs the workflow execution unit 703 to process the jobs. When blank page determination has been performed on the acquired data by the determining unit 701, the job execution/management unit 702 stores the image data in the image DB 306.

When a request to process the jobs has been received from the job execution/management unit 702, the workflow execution unit 703 controls the execution of the processes included in the workflow. Specifically, the workflow execution unit 703 controls the data processing unit 704 to identify the processes of the workflow included in the job, and sequentially perform the processes included in the workflow on the image data acquired from the image DB 306.

When an instruction to execute the processes is received from the workflow execution unit 703, the data processing unit 704 performs a distribution process on the image data in accordance with the received instruction. That is, the data processing unit 704 sequentially executes the processes included in the workflow in the order indicated in the workflow, and distributes the image data to the distribution destinations (file server, SMTP server).

The distribution setting DB 705 stores plug-ins of input, image conversion, and output, and stores one or more workflows corresponding to a combination of the plug-ins. The distribution setting DB 705 also stores default distribution parameters pertaining to the workflow, setting screen page information of the workflow, and setting screen page information of the distribution parameters.

Figure 20:
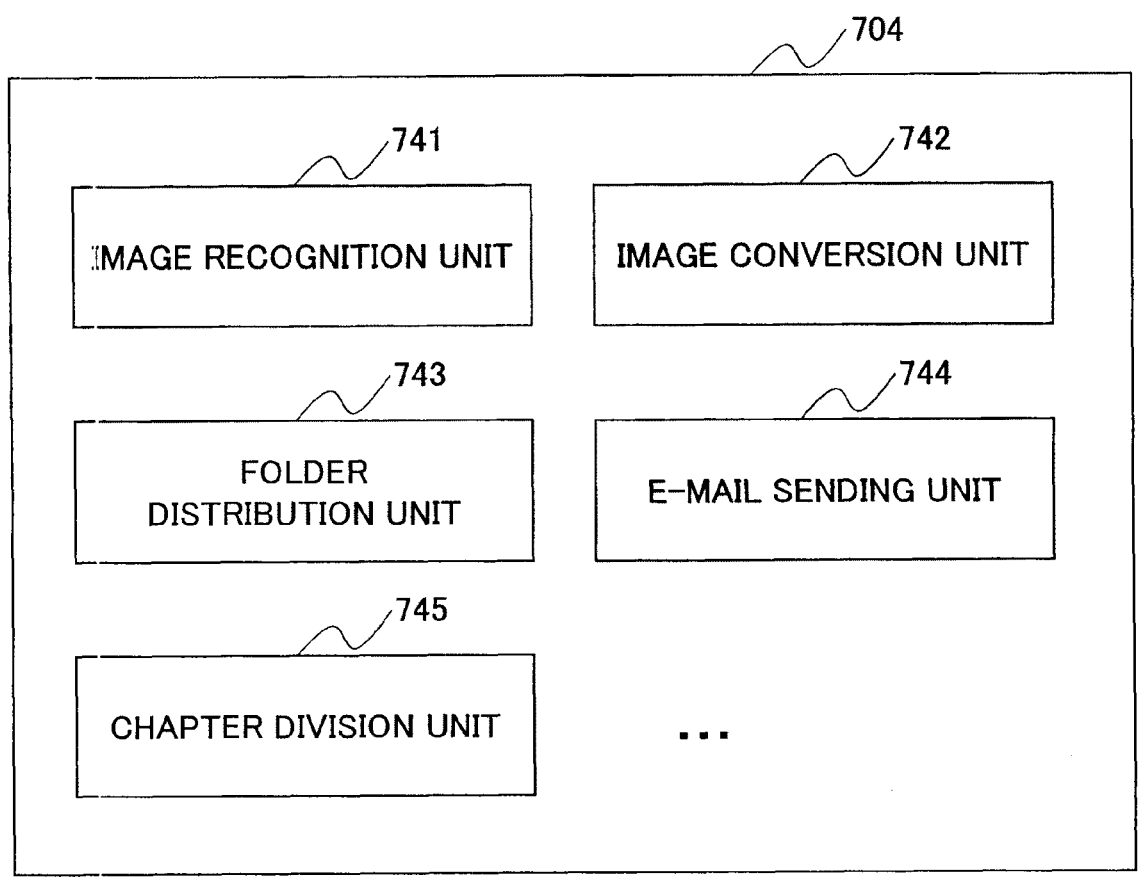
FIG. 20 is a functional block diagram of a data processing unit.

Next, the data processing unit 704 is described in detail with reference to FIG. 20. FIG. 20 is a functional block diagram of the data processing unit 704. The data processing unit 704 includes an image recognition unit 741, an image conversion unit 742, a folder distribution unit 743, an e-mail sending unit 744, and a chapter division unit 745. The units included in the data processing unit 704 may be implemented by plug-ins.

The image recognition unit 741 performs image recognition processes such as OCR (Optical Character Recognition) and/or OMR (Optical Mark Recognition). The image conversion unit 742 performs a process of converting a format such as PDF, TIFF, GIF, JPEG, and JPEG2000 into another format. The folder distribution unit 743 performs a process of distributing image data to a folder of a specified server. The e-mail sending unit 744 performs an e-mail distribution process with the use of an SMTP server.

The chapter division unit 745 divides the image data into chapters, assuming that one chapter corresponds to a section up to a point where the determining unit 701 determines the image to be blank, and stores the chapters in the image DB 306. Even when the chapter division unit 745 does not divide the image data into chapters, the chapter division unit 745 may add a chapter number to each blank page such as chapter 1, chapter 2, . . . , and store the chapters in the image DB 306.

When the job execution/management unit 702 acquires information instructing to perform chapter division, which is received from the MFP 15, the chapter division unit 745 receives a pertinent notification. The chapter division unit 745 that has received the notification performs chapter division every time the determining unit 701 determines that the image is blank, or when the determining unit 701 has completed the entire blank page determination process. Then, a distribution process is performed on the image data that has undergone the blank page determination process and the chapter division process.

According to the fourth embodiment, a distribution process according to a workflow can be executed on the image data that has undergone blank page determination. That is, blank page determination can be included in a scan solution for distributing image data obtained by a scanning process. Furthermore, according to the fourth embodiment, the image data can be divided into chapters, assuming that one chapter corresponds to a section up to a point where the determining unit 701 determines the image to be blank, and the image data divided into chapters can be distributed.

Fifth Embodiment

Next, a description is given of an image processing system according to a fifth embodiment of the present invention. In the fifth embodiment, when there are many blank pages included in the image data on which the distribution process is to be performed, the image processing system can confirm with a user whether to continue the distribution process.
<Function Configuration>

Figure 21:
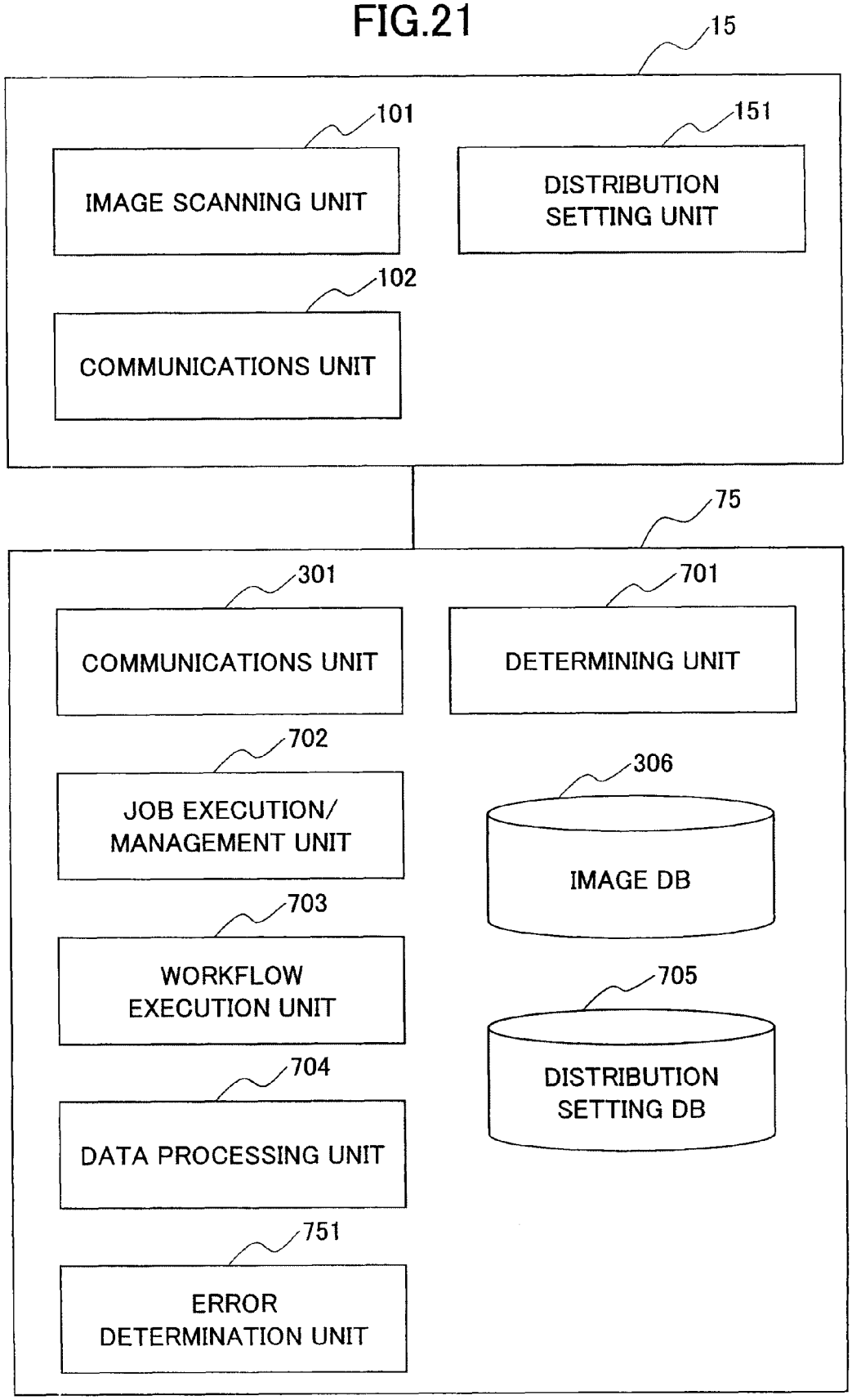
FIG. 21 is a functional block diagram of the MFP and an image processing server according to a fifth embodiment of the present invention.

FIG. 21 is a functional block diagram of the MFP 15 and an image processing server 75 according to the fifth embodiment. In FIG. 21, the same functions as those of FIGS. 3 and 18 are denoted by the same reference numerals and are not further described. As shown in FIG. 21, in the fifth embodiment, the image processing server 75 includes an error determination unit 751.

The error determination unit 751 determines that an error has occurred when the ratio of blank pages is greater than or equal to a predetermined value, as a result of the blank page determination performed by the determining unit 701. For example, when the number of blank pages corresponds to greater than or equal to 20% of the total number of pages included in the image data that has undergone the blank page determination, the error determination unit 751 determines that an error has occurred.

When it is determined that an error has occurred, the error determination unit 751 sends confirmation screen page information to the MFP 15. The confirmation screen page information may be stored in the image DB 306 or the distribution setting DB 705.

FIG. 22 illustrates an example of the confirmation screen page of a blank page detection error. The confirmation screen page shown in FIG. 22 is displayed on the operations panel of the MFP 15 when the error determination unit 751 determines that an error has occurred. When the MFP 15 detects that a user has pressed the "YES" button shown in FIG. 22, the MFP 15 sends a pertinent report to the image processing server 75, and the image processing server 75 continues the distribution process. When the MFP 15 detects that a user has pressed the "NO" button shown in FIG. 22, the MFP 15 prompts the user to instruct a scanning operation on the image data once again.

The confirmation screen page shown in FIG. 22 only has options to continue the distribution process or to discontinue the distribution process. However, there may be an option of removing the blank pages and continuing the distribution process. When the user selects the process of removing the blank pages and continuing the distribution process, the workflow execution unit 703 removes or deletes the blank pages when acquiring the image data from the image DB 306. The subsequent processes are the same as those described in the fourth embodiment.

According to the fifth embodiment, when there are many blank pages included in the image data on which the distribution process is to be performed, the image processing system can confirm with a user whether to continue the distribution process. Furthermore, according to the fifth embodiment, when the distribution process is continued, the blank pages can be excluded from the image data being distributed.

Sixth Embodiment

Next, a description is given of an image processing system according to a sixth embodiment of the present invention. In the sixth embodiment, image data determined as a blank page by the determining unit 701 is deleted, and image data not determined as a blank page is distributed.
<Function Configuration>

Figure 23:
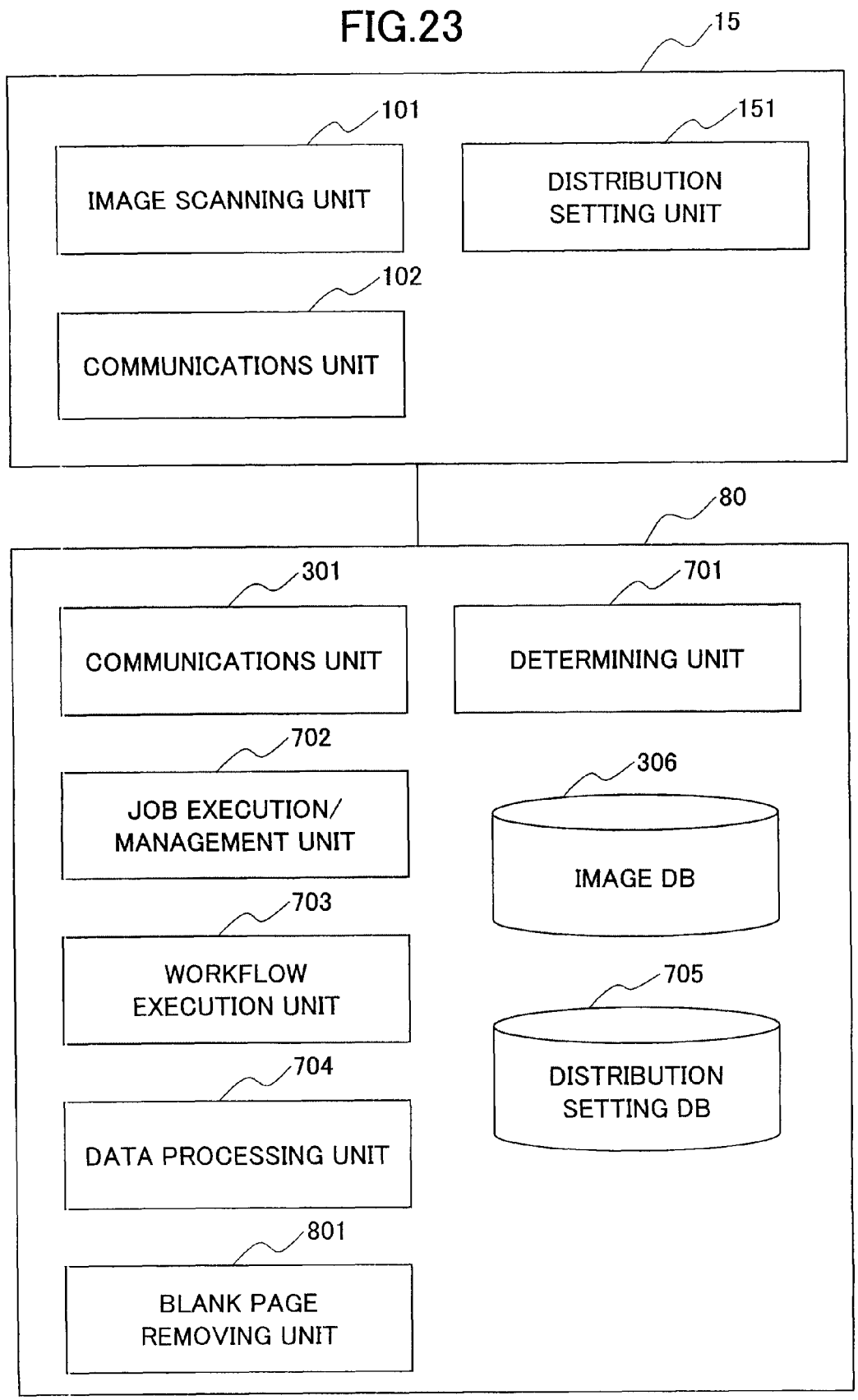
FIG. 23 is a functional block diagram of the MFP and an image processing server according to a sixth embodiment of the present invention.

FIG. 23 is a functional block diagram of the MFP 15 and an image processing server 80 according to the sixth embodiment. In FIG. 23, the same functions as those of FIGS. 3 and 18 are denoted by the same reference numerals and are not further described. As shown in FIG. 23, in the sixth embodiment, the image processing server 80 includes a blank page removing unit 801.

In the following, it is assumed that the distribution setting unit 151 detects a blank page removing mode, includes information indicating blank page removal in a job, and sends the job to the image processing server 80. The blank page removing process may be a default setting, or may be set to be executed only in a particular workflow.

When information indicating blank page removal is included in a job, the job execution/management unit 702 sends a pertinent report to the blank page removing unit 801, and outputs the image to the determining unit 701.

The blank page removing unit 801 deletes image data that has been determined as a blank page by the determining unit 701. The blank page removing unit 801 may delete a blank page every time the determining unit 701 determines the data as a blank page, or may delete all of the blank pages after the determining unit 701 has completed the entire blank page determination process. Accordingly, image data from which blank pages have been removed is stored in the image DB 306. The subsequent processes are the same as those described in the fourth embodiment.

According to the sixth embodiment, image data determined as a blank page by the determining unit 701 is deleted, and image data not determined as a blank page is distributed.
[Modification]

Figure 24:
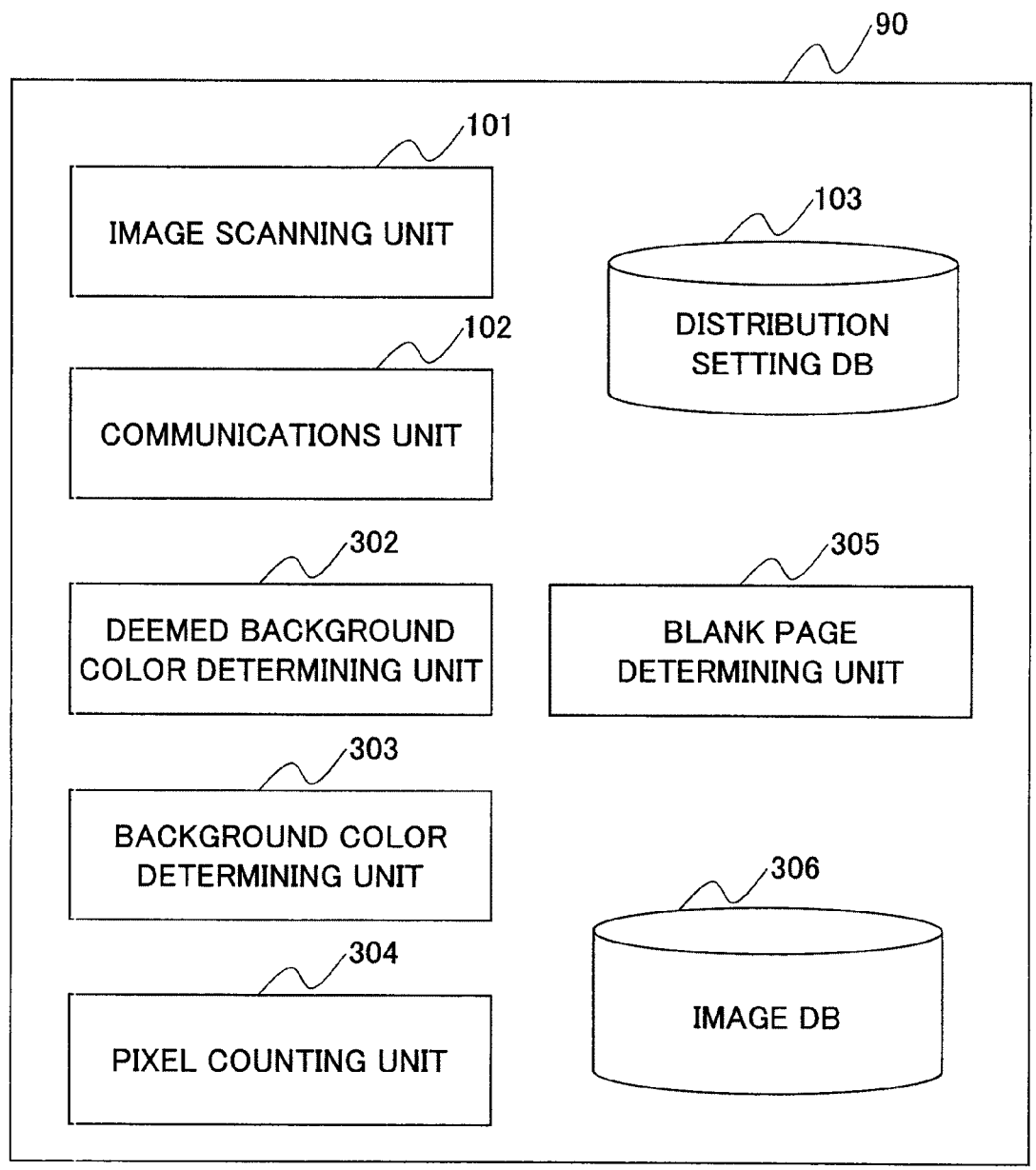
FIG. 24 is a functional block diagram of an image processing apparatus according to a modification of embodiments of the present invention.

Next, a description is given of a modification of the above embodiments. In the modification, an MFP 90 includes the above-described image processing server 30. In the modification, the MFP is referred to as an image processing apparatus. As shown in FIG. 24, the function for performing blank page determination is incorporated in the image processing apparatus 90.

The functions of the image processing apparatus 90 are basically the same as those shown in FIG. 3. However, the difference is that the deemed background color determining unit 302 performs the deemed background color determining process on image data obtained by the scanning process of the image scanning unit 101.

The image processing apparatus 90 according to the modification performs a blank page determination process on image data obtained by a scanning process, and performs a process of not saving image data that has been determined as a blank page, so that resources of the apparatus can be effectively used. Any of the image processing servers according to the second to sixth embodiments may be incorporated in the MFP.

Furthermore, the image processing apparatus 90 according to the modification can remove blank pages from the image data obtained by the scanning process before printing out the image data. Furthermore, the image processing apparatus 90 can perform blank sheet detection in the image data obtained by the scanning process, divide the image data into chapters assuming that one chapter corresponds to a section up to a point where the image data is determined to be blank, and print the image data divided into chapters.

Each of the image processing servers according the first to sixth embodiments has a hardware configuration using a work station or a typical computer, including a control device such as a CPU, a storage device such as a ROM (Read Only Memory) or a RAM, an external storage device such as an HDD or a CD drive device, a display device, and an input device such as a keyboard or a mouse.

An image processing program executed by the image processing servers according the first to sixth embodiments may be provided by being recorded in a computer-readable recording medium such as a CD-ROM, a flexible disk (FD), a CD-R, and a DVD (Digital Versatile Disk), as a file having an installable format or an executable format.

An image processing program executed by the image processing servers according the first to sixth embodiments may be stored in a computer connected to a network such as the Internet, and may be provided by being downloaded via the network. An image processing program executed by the image processing servers according the first to sixth embodiments may be provided or distributed via the network.

An image processing program executed by the image processing servers according the first to sixth embodiments may be provided by being incorporated in advance in, for example, a ROM.

An image processing program executed by the image processing servers according the first to sixth embodiments is constituted by modules including the above units. In terms of the actual hardware, the CPU (processor) reads the image processing program from the recording medium and executes the image processing program to load the above units in a main storage unit, so that the deemed background color determining unit, the background color determining unit, the image number count unit, and the blank page determining unit are generated in the main storage unit.

An image processing program executed by the MFP according the modification may be provided by being incorporated in advance in, for example, a ROM.

An image processing program executed by the MFP according the modification may be provided by being recorded in a computer-readable recording medium such as a CD-ROM, a flexible disk (FD), a CD-R, and a DVD (Digital Versatile Disk), as a file having an installable format or an executable format.

An image processing program executed by the MFP according the modification may be stored in a computer connected to a network such as the Internet, and may be provided by being downloaded via the network. An image processing program executed by the MFP according the modification may be provided or distributed via the network.

An image processing program executed by the MFP according the modification is constituted by modules including the above units. In terms of the actual hardware, the CPU (processor) reads the image processing program from the recording medium and executes the image processing program to load the above units in a main storage unit, so that the deemed background color determining unit, the background color determining unit, the image number count unit, and the blank page determining unit are generated in the main storage unit.

A computer-readable recording medium having recorded therein instructions for causing a computer to execute an image processing method including an acquiring step of acquiring image data;

a first determination step of creating one or more histograms of one or more colors in the image data acquired at the acquiring step, and determining on or more deemed background colors with the use of the histograms;

a second determination step of determining a background color based on the deemed background colors determined at the first determination step;

a counting step of counting a number of pixels corresponding to one or more character colors in the image data, wherein colors other than the background color determined at the second determination step are the character colors; and a deciding step of obtaining a ratio of the number of pixels corresponding to the character colors counted at the counting step to a total number of pixels in the image data, and performing blank page determination on the image data by determining that the image data is blank when the ratio is less than a first predetermined value.

The present invention is not limited to the specifically disclosed embodiment, and variations and modifications may be made without departing from the scope of the present invention.

The present application is based on Japanese Priority Patent Application No. 2009-010340, filed on Jan. 20, 2009 and Japanese Priority Patent Application No. 2009-252187, filed on Nov. 2, 2009, the entire contents of which are hereby incorporated herein by reference.

What is claimed is:

1. An image processing system for acquiring image data and processing the image data, the image processing system comprising:

an acquiring unit configured to acquire the image data;

a first determination unit configured to create one or more histograms of one or more colors in the image data acquired by the acquiring unit, and determine one or more deemed background colors with the use of the histograms;

a second determination unit configured to determine a background color based on the deemed background colors determined by the first determination unit;

a counting unit configured to count a number of pixels corresponding to one or more character colors in the image data, wherein colors other than the background color determined by the second determination unit are the character colors; and a deciding unit configured to obtain a ratio of the number of pixels corresponding to the character colors counted by the counting unit to a total number of pixels in the image data, and perform blank page determination on the image data by determining that the image data is blank when the ratio is less than a first predetermined value.

2. The image processing system according to claim 1, wherein the first determination unit calculates a first average value and a standard deviation for each of the histograms, and determines colors within a range of plus/minus the standard deviation from the first average value as the deemed background colors.

3. The image processing system according to claim 2, wherein
the first determination unit selects a histogram having a largest standard deviation from among the histograms of the colors, and determines the deemed background colors with the use of the selected histogram.

4. The image processing system according to claim 1, wherein
the second determination unit calculates a second average value of the deemed background colors, and determines a color within a predetermined range from the second average value as the background color.

5. The image processing system according to claim 4, wherein
the second determination unit determines a larger value between the standard deviation and a second predetermined value as a variability value, and determines a color within a range of plus/minus the variability value from the second average value as the background color.

6. The image processing system according to claim 1, further comprising:
a dividing unit configured to divide the image data into division units, wherein the image data is divided in units of at least one of lines and regions, wherein
the first determination unit sequentially reads the division units of the image data divided by the dividing unit and renews the histograms of the colors accordingly, and
the deciding unit sequentially performs the blank page determination on the division units by multiplying the first predetermined value by a coefficient, and reduces the coefficient every time a result of the blank page determination is blank.

7. The image processing system according to claim 6, wherein
when the result of the blank page determination is not blank, the deciding unit refrains from instructing the first determination unit to read a subsequent one of the division units of the image data, and ends the blank page determination.

8. The image processing system according to claim 1, further comprising:
a preprocess unit configured to perform one or more preprocessing operations on the image data, wherein the preprocessing operations include removing noise, punching holes, removing at least one of a header and a footer, eliminating show-through, and removing peripheral noise, wherein
the first determination unit creates the histograms of the colors in the image data that has undergone the preprocessing operations performed by the preprocess unit.

9. The image processing system according to claim 1, wherein
the first determination unit creates the histograms of the colors by performing a process corresponding to full-color conversion, when the image data is in palette colors.

10. The image processing system according to claim 1, further comprising:
a storing unit configured to store one or more workflows defining one or more processes including at least a distribution process; and
a distributing unit configured to perform, on the image data that has undergone the blank page determination performed by the deciding unit, the distribution process defined by the workflows.

11. The image processing system according to claim 10, further comprising:
a chapter division unit configured to divide the image data into chapters, wherein each chapter corresponds to a section up to a point where a result of the blank page determination performed by the deciding unit is blank, wherein
the distributing unit performs, on the image data that has been divided into the chapters by the chapter division unit, the distribution process defined by the workflow.

12. An image processing apparatus comprising:
an acquiring unit configured to acquire image data;
a first determination unit configured to create one or more histograms of one or more colors in the image data acquired by the acquiring unit, and determine one or more deemed background colors with the use of the histograms;
a second determination unit configured to determine a background color based on the deemed background colors determined by the first determination unit;
a counting unit configured to count a number of pixels corresponding to one or more character colors in the image data, wherein colors other than the background color determined by the second determination unit are the character colors; and
a deciding unit configured to obtain a ratio of the number of pixels corresponding to the character colors counted by the counting unit to a total number of pixels in the image data, and perform blank page determination on the image data by determining that the image data is blank when the ratio is less than a first predetermined value.

13. An image processing method comprising:
an acquiring step of acquiring image data;
a first determination step of creating one or more histograms of one or more colors in the image data acquired at the acquiring step, and determining one or more deemed background colors with the use of the histograms;
a second determination step of determining a background color based on the deemed background colors determined at the first determination step;
a counting step of counting a number of pixels corresponding to one or more character colors in the image data, wherein colors other than the background color determined at the second determination step are the character colors; and
a deciding step of obtaining a ratio of the number of pixels corresponding to the character colors counted at the counting step to a total number of pixels in the image data, and performing blank page determination on the image data by determining that the image data is blank when the ratio is less than a first predetermined value.

* * * * *